US010666426B2

(12) United States Patent
Roets

(10) Patent No.: US 10,666,426 B2
(45) Date of Patent: *May 26, 2020

(54) DISTRIBUTED LEDGER INTERACTION SYSTEMS AND METHODS

(71) Applicant: DRAGONCHAIN, INC., Bellevue, WA (US)

(72) Inventor: Joe Roets, Bellevue, WA (US)

(73) Assignee: Dragonchain, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,261

(22) Filed: Nov. 19, 2018

(65) Prior Publication Data

US 2019/0089525 A1    Mar. 21, 2019

Related U.S. Application Data

(63) Continuation of application No. 16/101,343, filed on Aug. 10, 2018, now Pat. No. 10,135,607.

(60) Provisional application No. 62/544,218, filed on Aug. 11, 2017.

(51) Int. Cl.
| | | |
|---|---|---|
| H04L 29/06 | (2006.01) | |
| H04L 9/06 | (2006.01) | |
| H04L 9/32 | (2006.01) | |
| G06F 21/64 | (2013.01) | |
| G06Q 20/36 | (2012.01) | |
| G06Q 20/02 | (2012.01) | |
| G06Q 20/38 | (2012.01) | |
| G06F 21/10 | (2013.01) | |
| G06F 16/27 | (2019.01) | |

(52) U.S. Cl.
CPC ............ *H04L 9/0637* (2013.01); *G06F 21/10* (2013.01); *G06F 21/64* (2013.01); *G06Q 20/02* (2013.01); *G06Q 20/36* (2013.01); *G06Q 20/389* (2013.01); *H04L 9/3213* (2013.01); *H04L 9/3239* (2013.01); *G06F 16/27* (2019.01); *G06Q 2220/00* (2013.01); *H04L 2209/38* (2013.01)

(58) Field of Classification Search
CPC ............ H04L 2209/38; H04L 2209/56; H04L 9/0643; G06F 21/64
See application file for complete search history.

(56) References Cited

U.S. PATENT DOCUMENTS

| | | |
|---|---|---|
| 9,569,439 B2 | 2/2017 | Davis et al. |
| 9,569,771 B2 | 2/2017 | Lesavich et al. |
| 9,646,029 B1 | 5/2017 | Baird, III |

(Continued)

OTHER PUBLICATIONS

"A NEO Way to Dragonchain: Connecting ERC20 Token Projects With NEP-5 Token Projects, such as Biocrypt," Dragonchain, Inc., Bellevue, WA, May 16, 2018.

(Continued)

*Primary Examiner* — Dao Q Ho
(74) *Attorney, Agent, or Firm* — ÆON Law; Adam L. K. Philipp; Jonathan E. Olson

(57) ABSTRACT

Distributed public ledger interaction methods and systems are presented by which one or more elements of a first smart contract are privately recorded on a secure ledger node. In some variants the first smart contract is executed so as to retrieve public ledger node data from a first public ledger node so as to configure at least one transaction that is thereafter executed at least to the first public ledger node or to a second public ledger node (or both).

20 Claims, 12 Drawing Sheets

(56) References Cited

U.S. PATENT DOCUMENTS

| | | |
|---|---|---|
| 9,672,499 B2 | 6/2017 | Yang et al. |
| 9,747,586 B1 | 8/2017 | Frolov et al. |
| 10,050,959 B2 | 8/2018 | Soon-Shiong et al. |
| 10,063,568 B1 | 8/2018 | Ford et al. |
| 10,068,397 B2 | 9/2018 | Day et al. |
| 10,121,025 B1 | 11/2018 | Rice |
| 2010/0332336 A9 | 12/2010 | Quigley et al. |
| 2012/0020476 A1 | 1/2012 | Billet et al. |
| 2012/0095908 A1 | 4/2012 | Barrie et al. |
| 2013/0061288 A1 | 3/2013 | Palm |
| 2016/0021093 A1 | 1/2016 | Vinckier |
| 2016/0260095 A1 | 9/2016 | Ford |
| 2016/0321654 A1 | 11/2016 | Lesavich |
| 2017/0011460 A1* | 1/2017 | Molinari ............... G06Q 40/04 |
| 2017/0048235 A1 | 2/2017 | Lohe |
| 2017/0091756 A1 | 3/2017 | Stem |
| 2017/0103468 A1 | 4/2017 | Orsini |
| 2017/0109638 A1 | 4/2017 | Marcu et al. |
| 2017/0109639 A1 | 4/2017 | Marcu et al. |
| 2017/0109668 A1 | 4/2017 | Marcu et al. |
| 2017/0109735 A1 | 4/2017 | Sheng |
| 2017/0109748 A1 | 4/2017 | Kote |
| 2017/0116693 A1 | 4/2017 | Rae |
| 2017/0132630 A1* | 5/2017 | Castinado .......... G06Q 20/4014 |
| 2017/0287090 A1 | 10/2017 | Hunn |
| 2017/0364698 A1 | 12/2017 | Goldfarb et al. |
| 2018/0097841 A1 | 4/2018 | Stolarz et al. |
| 2018/0129955 A1 | 5/2018 | Saxena et al. |
| 2018/0157825 A1 | 6/2018 | Eksten et al. |
| 2018/0167198 A1 | 6/2018 | Muller et al. |
| 2018/0183606 A1 | 6/2018 | High et al. |
| 2018/0183687 A1 | 6/2018 | Dementev et al. |
| 2018/0247191 A1 | 8/2018 | Katz et al. |
| 2018/0285840 A1 | 10/2018 | Hasan |
| 2018/0300476 A1 | 10/2018 | Guillama et al. |
| 2018/0332070 A1 | 11/2018 | Ford et al. |
| 2018/0332072 A1 | 11/2018 | Ford et al. |
| 2018/0337769 A1 | 11/2018 | Gleichauf |
| 2019/0036887 A1 | 1/2019 | Miller |

OTHER PUBLICATIONS

"Caliper Introduction," Apache Software Foundation, Jan. 2004 http://crativecommons.org/licenses/by/4.0/.

"Disney Dragonchain: Blockchain Use Cases," from Notes from Disney, provided as input to the W3C Blockchain Community Group, Jun. 20, 2016.

"Dragonchain Commercial Platform, Version 5," Dragonchain ©, Dragonchain, Inc., Bellevue, WA, Sep. 2017.

Hyperledger Caliper Readme.

Roets, J., "Dragonchain Architecture: Version 3—Nov. 2016," © 2016, Joe Roets and Super Happy Dragon Lucky.

Suberg, William, "Italian Stock Exchange to Develop Hyperledger-Based Blockchain Shares Platform," Jul. 19, 2017 <https://cointelegraph.com/news/blockson-announces-blockshow-americas-2018-conference-in-las-vegas-august-20-21>.

Zhou, H., and Hu, V., "Project Caliper Proposal: HIP Identifier, Hyperledger Caliper," Mar. 2018.

* cited by examiner

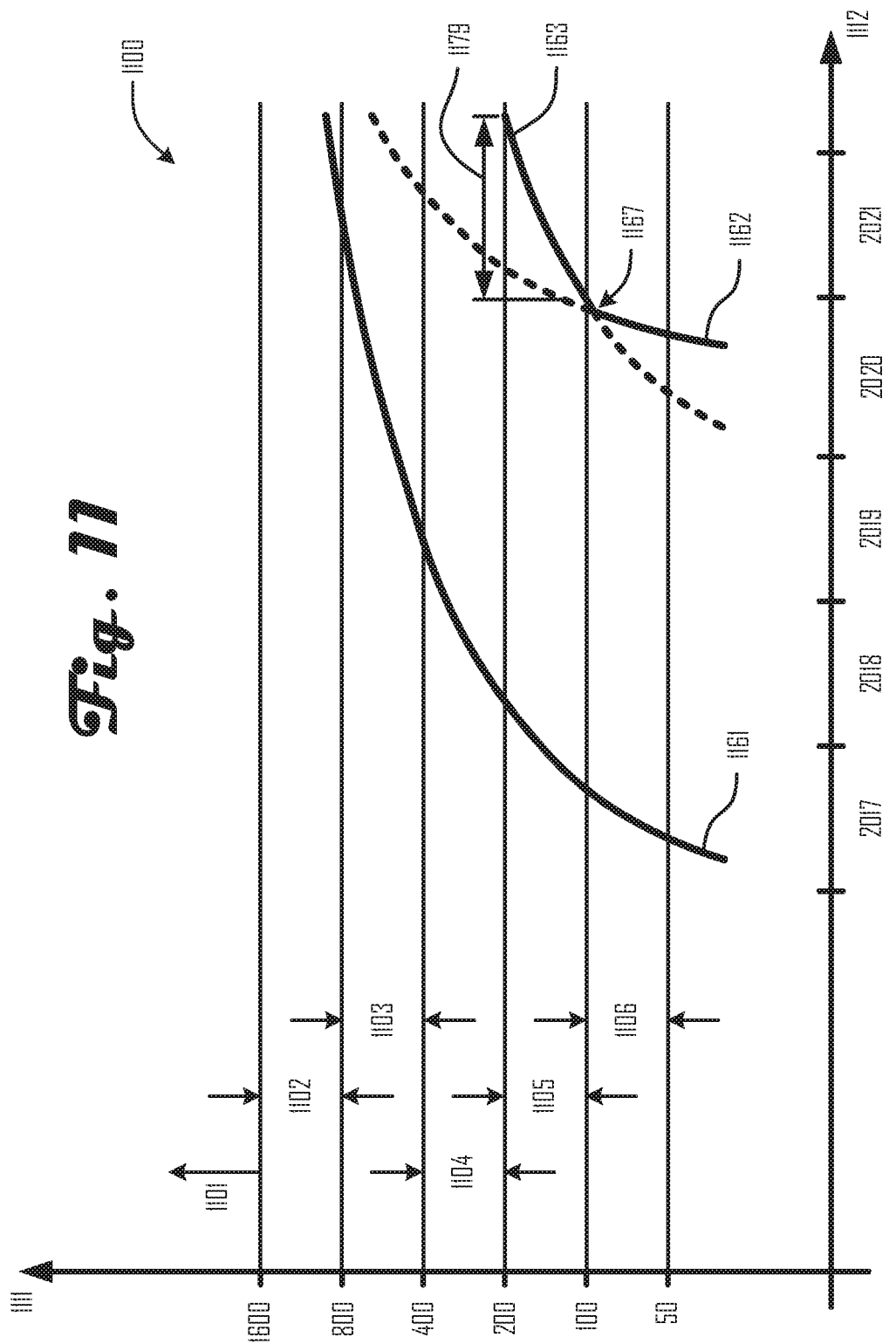

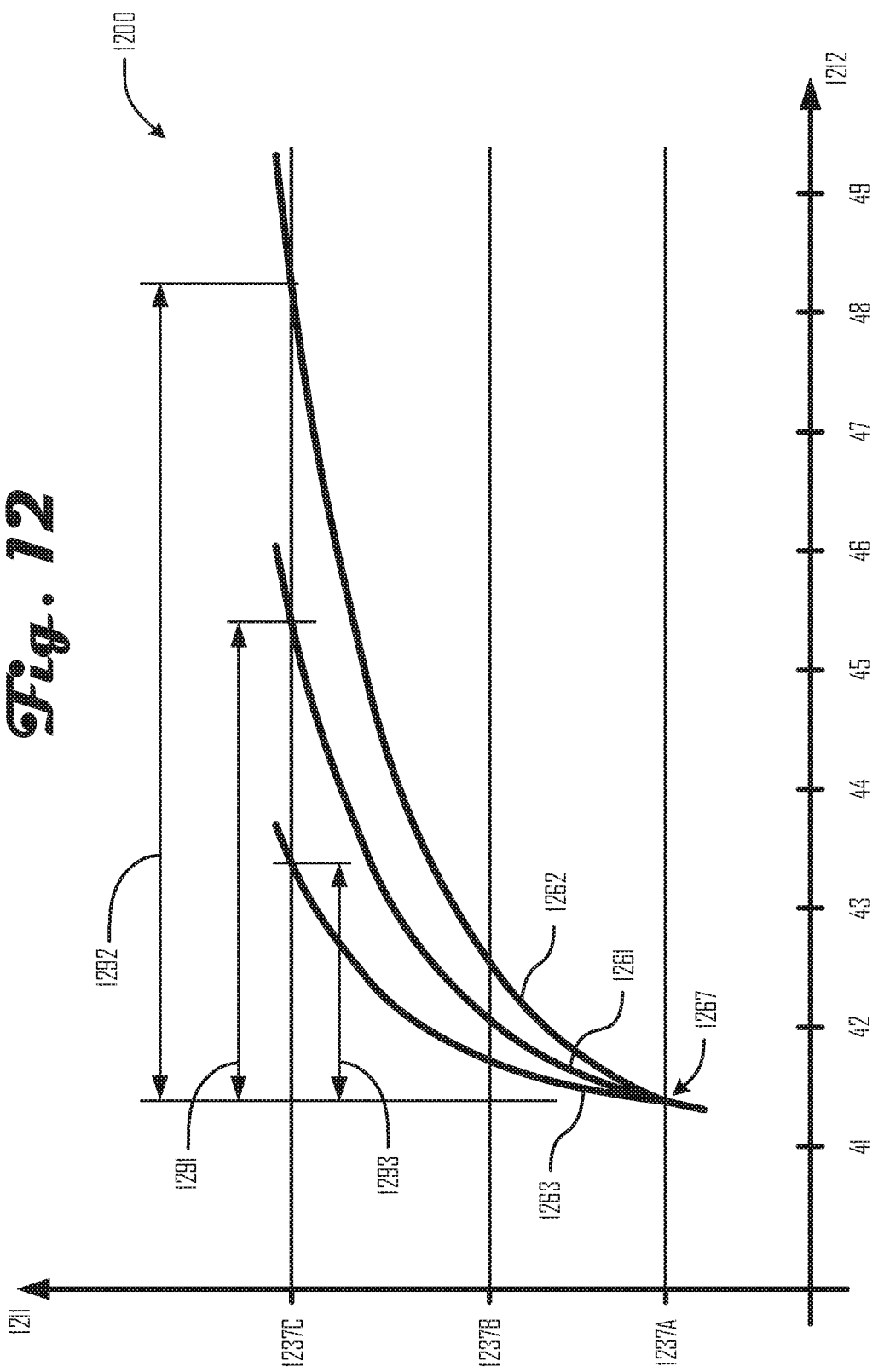

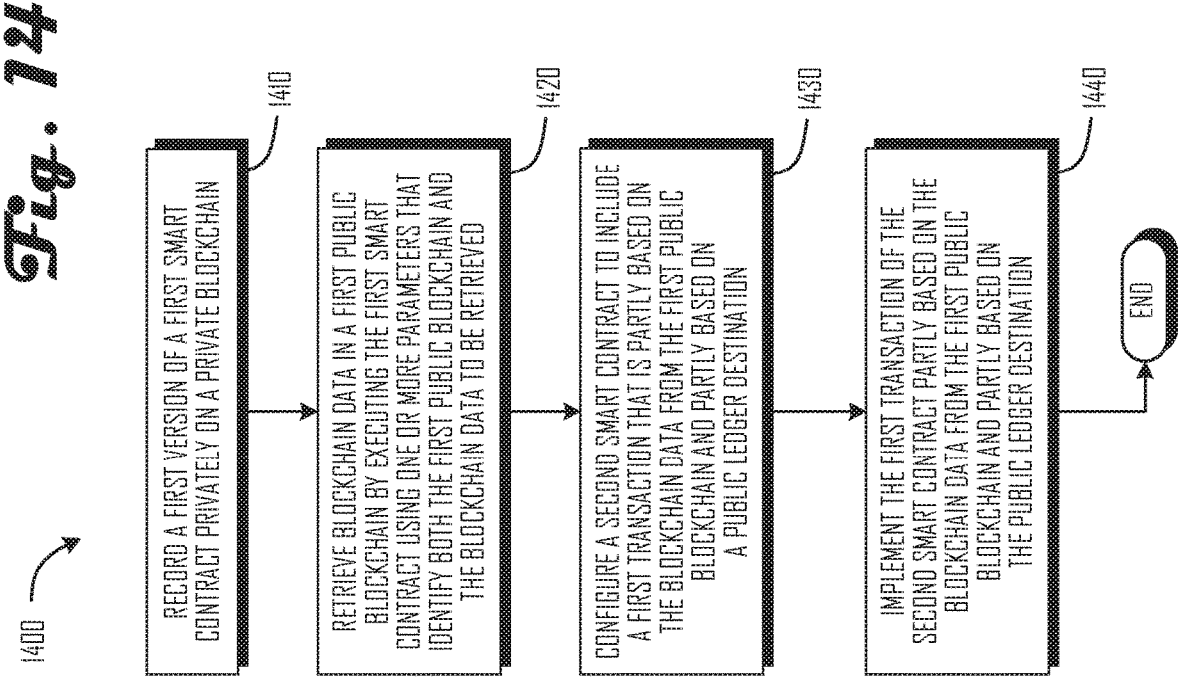
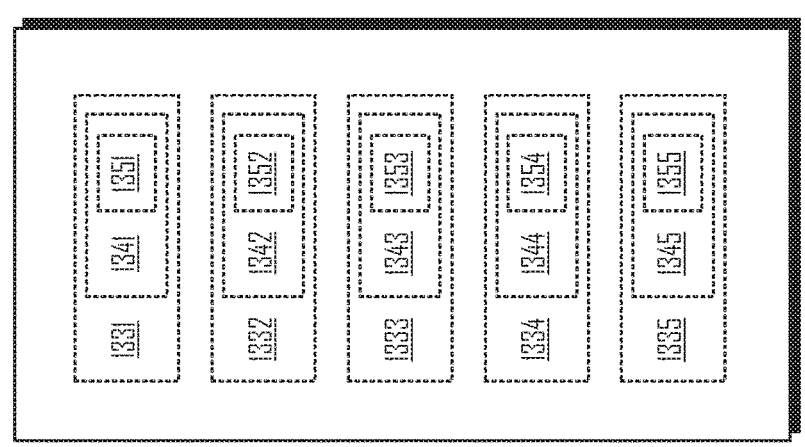

DISTRIBUTED LEDGER INTERACTION SYSTEMS AND METHODS

RELATED APPLICATIONS

This application claims the benefit of U.S. Prov. App. No. 62/544,218 (entitled "Tokenized Micro-Licenses and Smart Contracts" and filed 11 Aug. 2017) which is incorporated by reference in its entirety for all purposes.

BACKGROUND

Before the 1990s, many software makers sold licenses to use a particular version of a software product. With the connectivity of the Internet, software could be updated readily by the vendor, and many software products were licensed for all updates for a major version of the product. That is, the user would have license rights to obtain and use all updates to a product until a new, major version was released. After a new release, they could continue to use the old and unsupported version or purchase an upgrade. This offered added flexibility to the consumer and vendor. The vendor could make much needed updates to fix bugs found after release and provide non-major upgrades. The consumer would get some level of new value in minor version of the product and also physically held the software to use at any time in the future. Some examples of the use of the version-based licensing model are Microsoft Windows 3.1 and Adobe Photoshop 7.0.

In the 1990s and 2000s, many software vendors began to use the approaching ubiquity of the Internet to provide subscription-based licensing, wherein the consumer pays on a time basis for access to software. In this model, the user will typically not hold the software or run it on a local machine. Instead, the software is managed and executed on centrally managed hardware by the vendor. This allows for very simple updates to the software in place in a consistent manner and will generally lower maintenance cost to the consumer and vendor. The vendor can control access to the services as welt and can provide the ability to provide feature driven pricing models for the services and particular advanced features. The negative for the consumer is generally in the loss of right and possession of the software. The model generally represents the shift from licensing rights to own the purchased software and possess it physically to a utility focused right. That is, the consumer has a right to access the service or its underlying application software interfaces (API). The consumer never possesses the software or its executable code. If the consumer stops paying for the subscription, access is withdrawn and is unavailable. Among other issues, this model did not standardize or solve the resulting issue with ownership of the consumers' data on the system. That is, when using a subscription license, how does a user retain control of the data produced or held in the subscription-based license system? If the system stores the data in the vendor's infrastructure (very typical due to efficiency), then the consumer will need some ability to extract their data from the vendor's storage. Some examples of the use of the subscription licensing model are Google GSuite, Microsoft Office 365, and Adobe Creative Cloud.

For these and many other security-related or efficiency-related aspects of distributed ledgers and devices via which they operate, a variety of technological improvements are presented below.

BRIEF DESCRIPTION OF THE DRAWINGS

FIG. 11 is a semi-log plot showing how trustworthiness can increase over time in which one or more improved vetting technologies may be incorporated.

FIG. 12 is another plot showing how trustworthiness can increase over time in which one or more improved vetting technologies may be incorporated.

FIG. 13 depicts special-purpose transistor-based circuitry in which one or more improved technologies may be incorporated.

FIG. 14 depicts an operational flow in which one or more improved technologies may be incorporated.

DETAILED DESCRIPTION

Figure 1:
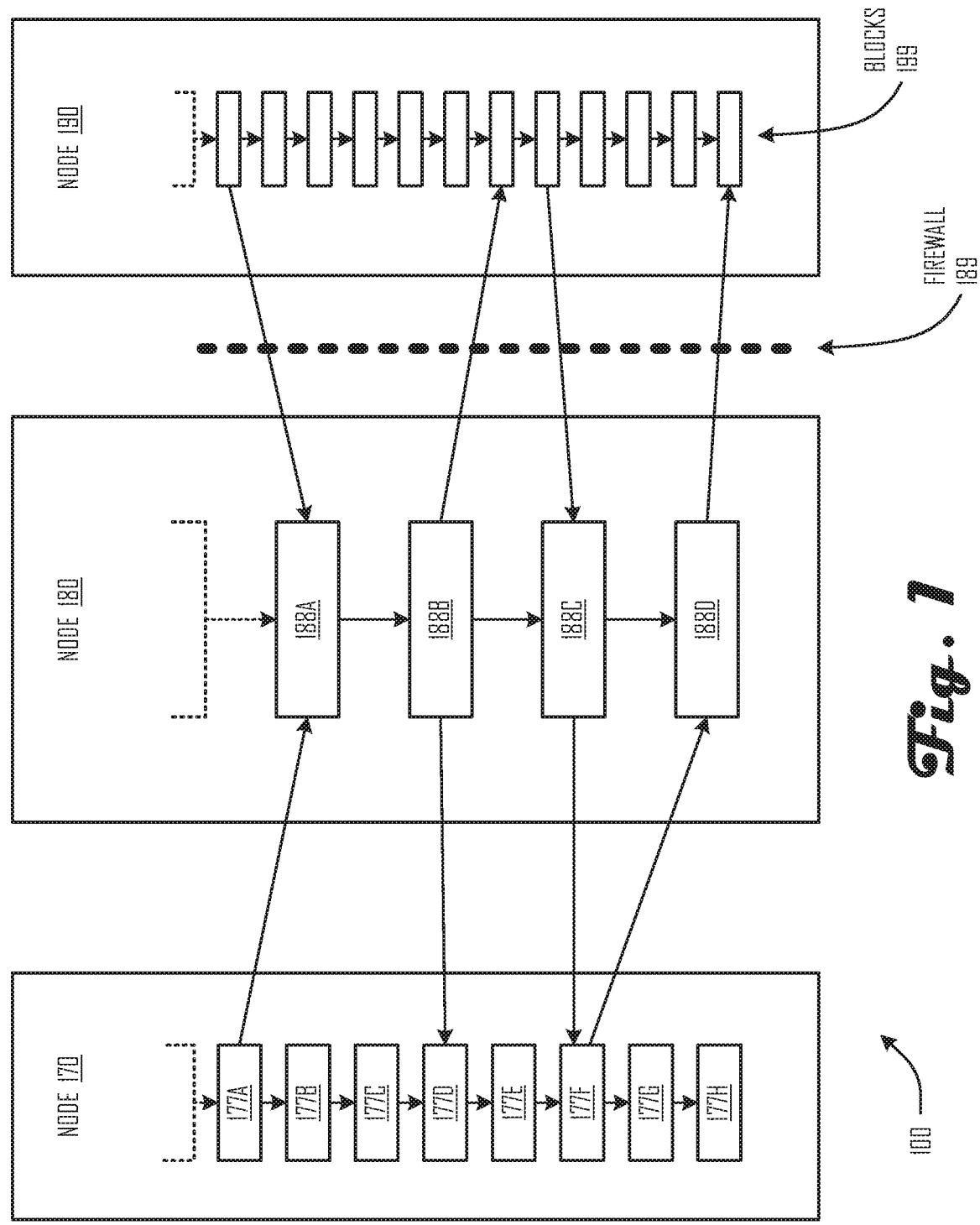
FIG. 1 schematically illustrates a system in which respective distributed ledger nodes interact according to one or more improved technologies.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "accelerating," "achieved," "aggregate," "any," "application-type," "application-specific," "automatic," "availability," "based on," "because," "complete," "comprising," "conditional," "configured," "correlated," "current," "decelerating," "decreasing," "digital," "directly," "distributed ," "executed," "first," "higher," "hybrid," "implemented," "inalterable ," "included," "indicated,"

"integrated," "malicious," "monotonic," "more," "mutually," "negatively," "of," "otherwise," "particular," "partly," "positively," "prior," "private," "public," "received," "remote," "requester-specified," "responsive," "second," "sequencing," "shorter," "signaling," "single," "smart," "so as," "special-purpose," "specific," "stepwise," "suitability," "techniques," "temporal," "third," "through," "transistor-based," "undue," "updated," "upon," "utility," "version-controlled," "via," "without," or other such descriptors herein are used in their normal yes-or-no sense, not merely as terms of degree, unless context dictates otherwise. As used herein "inventory-type" instruction sets are those that primarily implement asset transfers or verifications thereof, moving quantities among accounts rather than changing them. As used herein "data transformative" instruction sets are those that primarily implement other kinds of computations. Although one of these types of instruction sets may invoke the other as a subroutine, only very rarely is a single code component of instructions a true hybrid.

In light of the present disclosure those skilled in the art will understand from context what is meant by "remote" and by other such positional descriptors used herein. Likewise they will understand what is meant by "partly based" or other such descriptions of dependent computational variables/signals. "On-chain" refers to (permanent) inclusion in a blockchain, whether or not such content is public or transparent. "On-list" encompasses not only on-chain but also other content linked and effectively rendered immutable using cryptography (e.g. in a consensus-based data verification). In an implementation that includes "on-list" content (e.g. a blockchain or tangle) as described below, "off-list" refers to content elements (e.g. an in-app account ledger) that have yet to be included "on-list." A "batch" data distribution (broadcast) is one in which data is directed to numerous recipients (i.e. dozens or more) within a limited time (e.g. less than 24 hours) after a triggering event (e.g. an administrator action or weekly trigger time). Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a system 100 in which respective distributed ledger nodes 170, 180, 190 interact. Each node primarily include a blockchain or other distributed ledger, each occasionally progressing downward with the addition of a new block. As shown node 170 includes an oldest block 177A (built upon one or more predecessor blocks), a newest block 177H, and other blocks 177B-G between them. Node 180 likewise includes an oldest block 188A, a newest block 188D, and other blocks 188B-C between them. Node 190 likewise includes a chain of blocks. As further described below, node 180 has been constructed by a series of interactions with these other nodes 170, 190. One or more smart contracts of node 180 (see FIG. 6) read one or more elements from block 177A and from a particular one of the blocks 199 of node 190, combining the elements and recording the result in block 188A. Likewise one or more smart contracts provided one or more elements of block 188B to be recorded or otherwise reflected in block 177D and in a later one of the blocks 199 of node 190. Thereafter one or more elements of the then-newest block 199 of node 190 was read and used in generating block 188C, one or more elements of which were provided for use in node 170. That use allowed block 177F to be recorded, and one or more elements (e.g. transactions) thereof was recorded in block 188D and relayed to the now-newest block 199 of node 190. Insofar that smart contracts or other software agents may be executing at any or all of these nodes 170, 180, 190, a firewall 189 may be used to protect node 180 from pernicious code components or other forms of intrusion (e.g. from node 190). To guard against other forms of attack (e.g. from visitors), additional constraints may be imposed by one or more servers (e.g. of a network containing a private or hybrid public/private node 180).

As used herein, a plain reference numeral (e.g. like 177) may refer generally to a member of a class of items (e.g. like ledger blocks) exemplified with a hybrid numeral (e.g. like 177A) and it will be understood that every item identified with a hybrid numeral is also an exemplar of the class. Moreover although a reference numeral shared between figures refers to the same item, most figures depict respective embodiments.

Figure 2:
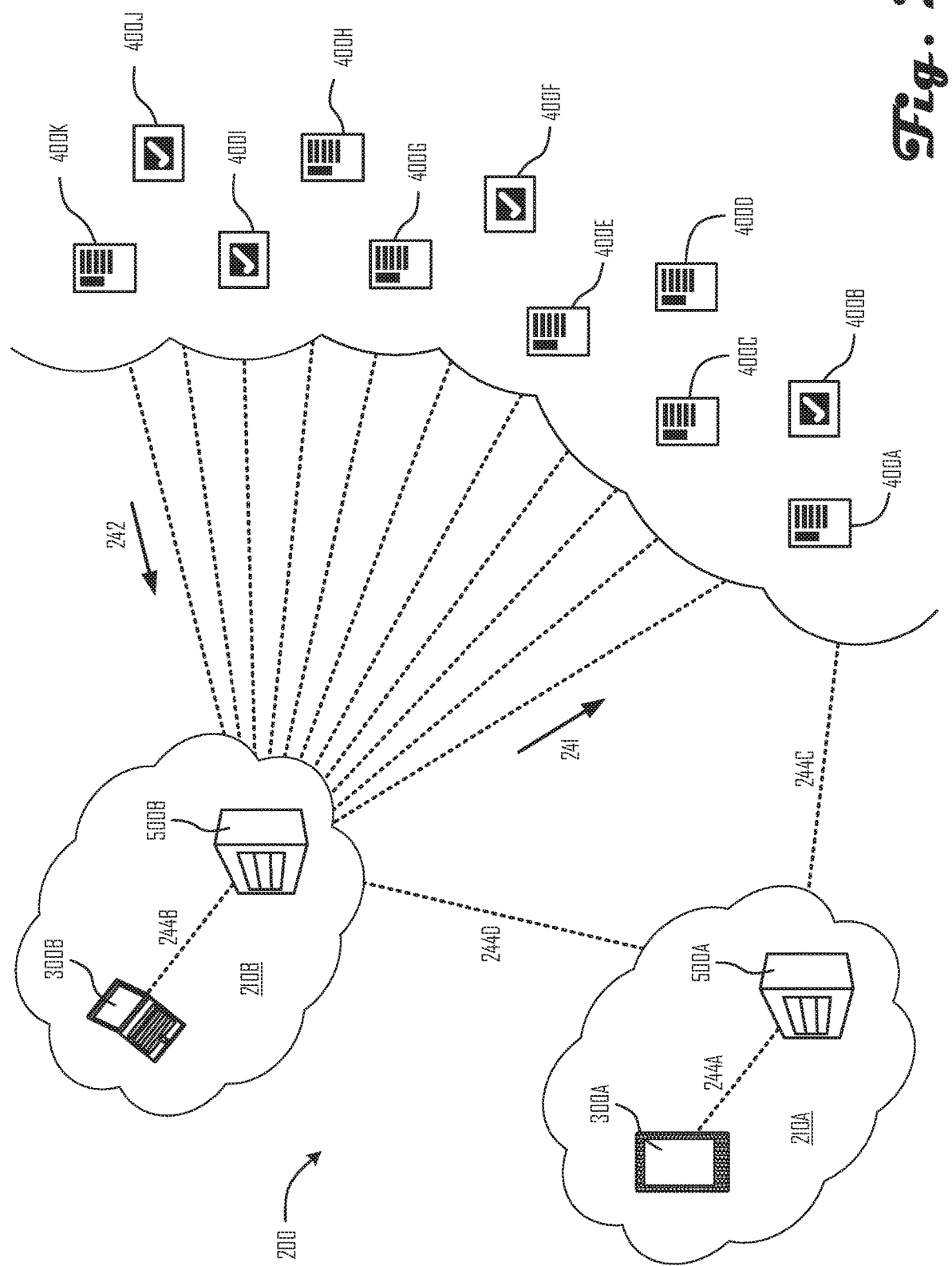
FIG. 2 schematically illustrates a system in which respective users or other entities interact with one another and with participating mining rigs or similar distributed devices in which one or more improved technologies may be incorporated.

FIG. 2 schematically illustrates a system 200 in which respective entities 210A-B interact with one another and with participating mining rigs 400K or similar distributed devices 400A-J many of which are, at various times, able to implement a transaction 241 or confirm an asset transfer or other occurrence as described below (e.g. by confirmations 242). In some variants a private entity 210A comprises one or more node management servers 500A that interact with one or more client devices 300A thereof (e.g. via respective instances of linkage 244A). Likewise a public or collective entity 210B comprises one or more node management servers 500B that interact with one or more client devices 300B thereof (e.g. via respective instances of linkage 244B). In some instances (e.g. in response to interactions via linkages 244C-D) the entities 210A-B may cooperate so that updates (e.g. indicia of dispensations, distributed ledger recordations, or other events) to values maintained at (one or more instances of) server 500B are received and so that adequately timely confirmations to those updates can occur in a decentralized fashion. In an instance where node 170 is distributed across multiple servers 500B in a proof-of-work architecture, for example, numerous proof-of-work blockchain nodes 400A, 400C, 400D, 400E, 400G, 400H, 400K (e.g. each implementing a mining rig) may validate changes to node 180 (e.g. by correctly identifying which block 177H was added last) so as to maintain or rebuild consensus. Alternatively or additionally, such consensus may be maintained or rebuilt using numerous (proof-of-stake or other) secure blockchain nodes 400B, 400F, 400I, 400J not configured as a mining rig may validate changes to node 180 in other blockchain proof architectures currently in public use.

Figure 3:
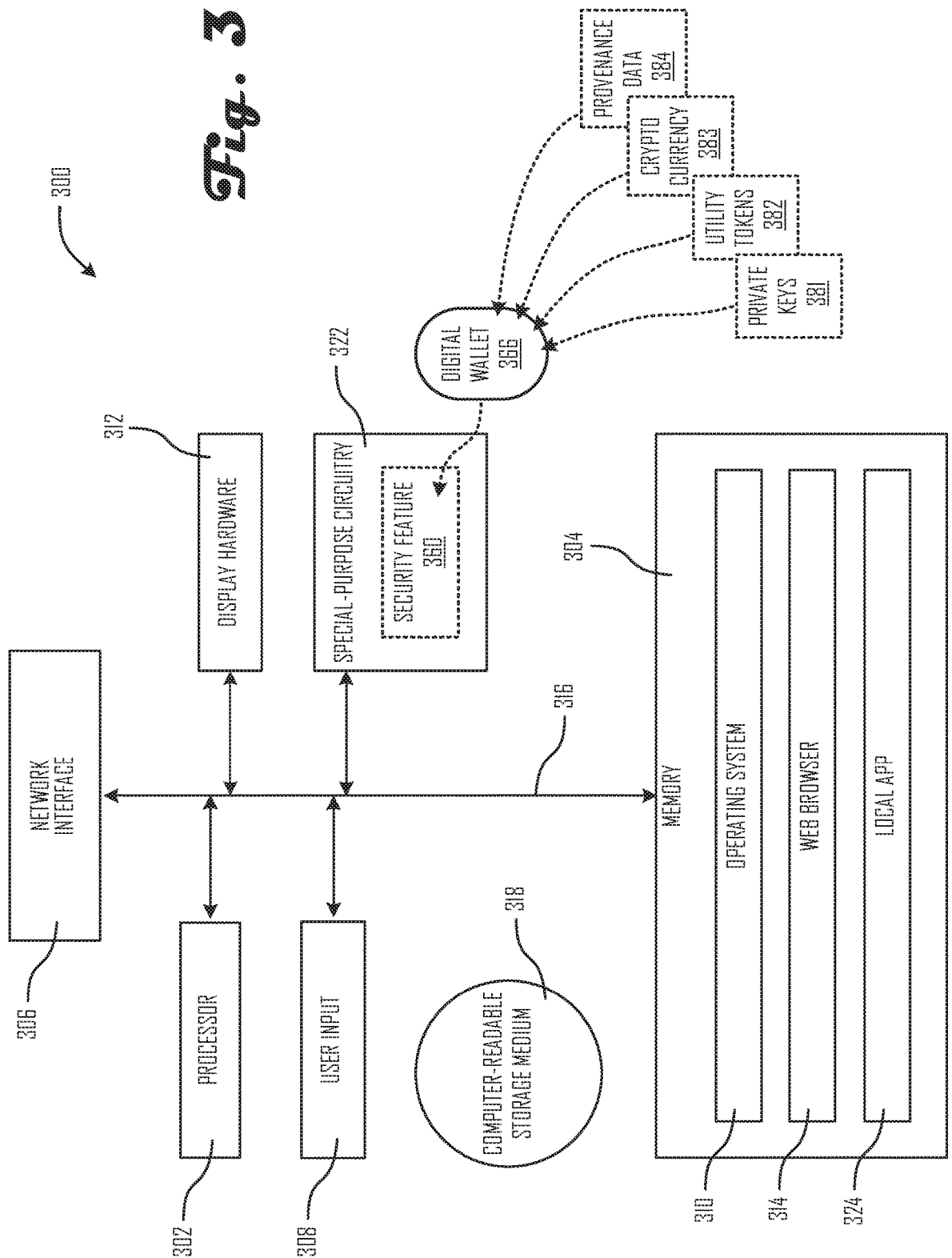
FIG. 3 depicts a client device in which one or more improved technologies may be incorporated.

Referring now to FIG. 3, there is shown a client device 300 in which one or more technologies may be implemented. Device 300 may include one or more instances of processors 302, memory 304, user inputs 308, and display hardware 312 all interconnected along with the network interface 306 via a bus 316. One or more network interfaces 306 allow device 300 to connect via the Internet or other networks to or within entities 210 of FIG. 2). Memory 304 generally comprises a random access memory ("RAM"), a read only memory ("ROM"), and a permanent mass storage device, such as a disk drive.

Memory 304 may contain one or more instances of operating systems 310, web browsers 314, and local apps 324. These and other software components may be loaded from a non-transitory computer readable storage medium 318 into memory 304 of the client device 300 using a drive mechanism (not shown) associated with a non-transitory computer readable storage medium 318, such as a floppy disc, tape, DVD/CD-ROM drive, flash card, memory card, or the like. In some embodiments, software components may also be loaded via the network interface 306, rather than via a computer readable storage medium 318. Special-purpose circuitry 322 may, in some variants, include some or all of the event-sequencing logic described below (e.g. in a peer-to-peer implementation) and one or more security features 360 (e.g. a fob or similar security apparatus).

In some contexts security feature 360 may implement or otherwise interact with a removable or other digital wallet 366. Such wallets may (optionally) each include one or more instances of private keys 381, of utility tokens 382, of crypto currency 383, of provenance data 384, or of device-executable code snippets (e.g. smart contracts) or the like as described below. In some embodiments client device 300 may include many more components than those shown in FIG. 3, but it is not necessary that all conventional components be shown in order to disclose an illustrative embodiment.

Figure 4:
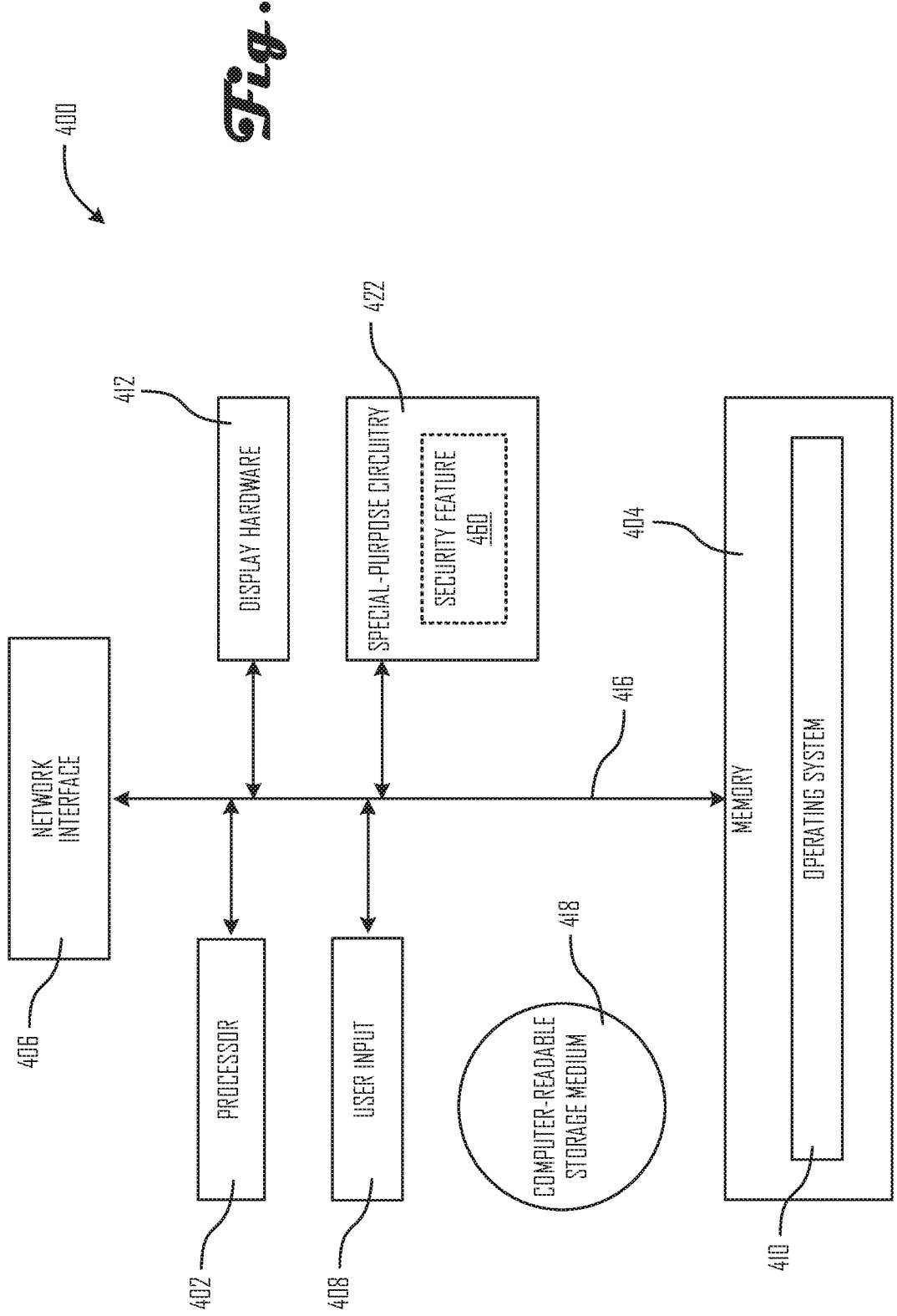
FIG. 4 depicts a distributed ledger verification device in which one or more improved technologies may be incorporated.

Referring now to FIG. 4, there is shown a distributed ledger verification device 400 like those of FIG. 2. Device 400 may include one or more instances of processors 402, memory 404, user inputs 408, and display hardware 412 all interconnected along with the network interface 406 via a bus 416. One or more network interfaces 406 allow device 400 to connect via the Internet or other networks to or within entities 210 of FIG. 2). Memory 404 generally comprises a random access memory ("RAM"), a read only memory ("ROM"), and a permanent mass storage device, such as a disk drive.

Memory 404 may contain one or more instances of operating systems 410 and special-purpose software. These and other software components may be loaded from a non-transitory computer readable storage medium 418 into memory 404 of the client device 400 using a drive mechanism (not shown) associated with a non-transitory computer readable storage medium 418, such as a floppy disc, tape, DVD/CD-ROM drive, flash card, memory card, or the like. In some embodiments, software components may also be loaded via the network interface 406, rather than via a computer readable storage medium 418. Special-purpose circuitry 422 may, in some variants, include some or all of the event-sequencing logic described below (e.g. in a peer-to-peer implementation) and one or more security features 460 (e.g. specially configured graphics processors or trusted entity private keys). In some embodiments client device 400 may include many more components than those shown in FIG. 4, but it is not necessary that all conventional components be shown in order to disclose an illustrative embodiment.

Figure 5:
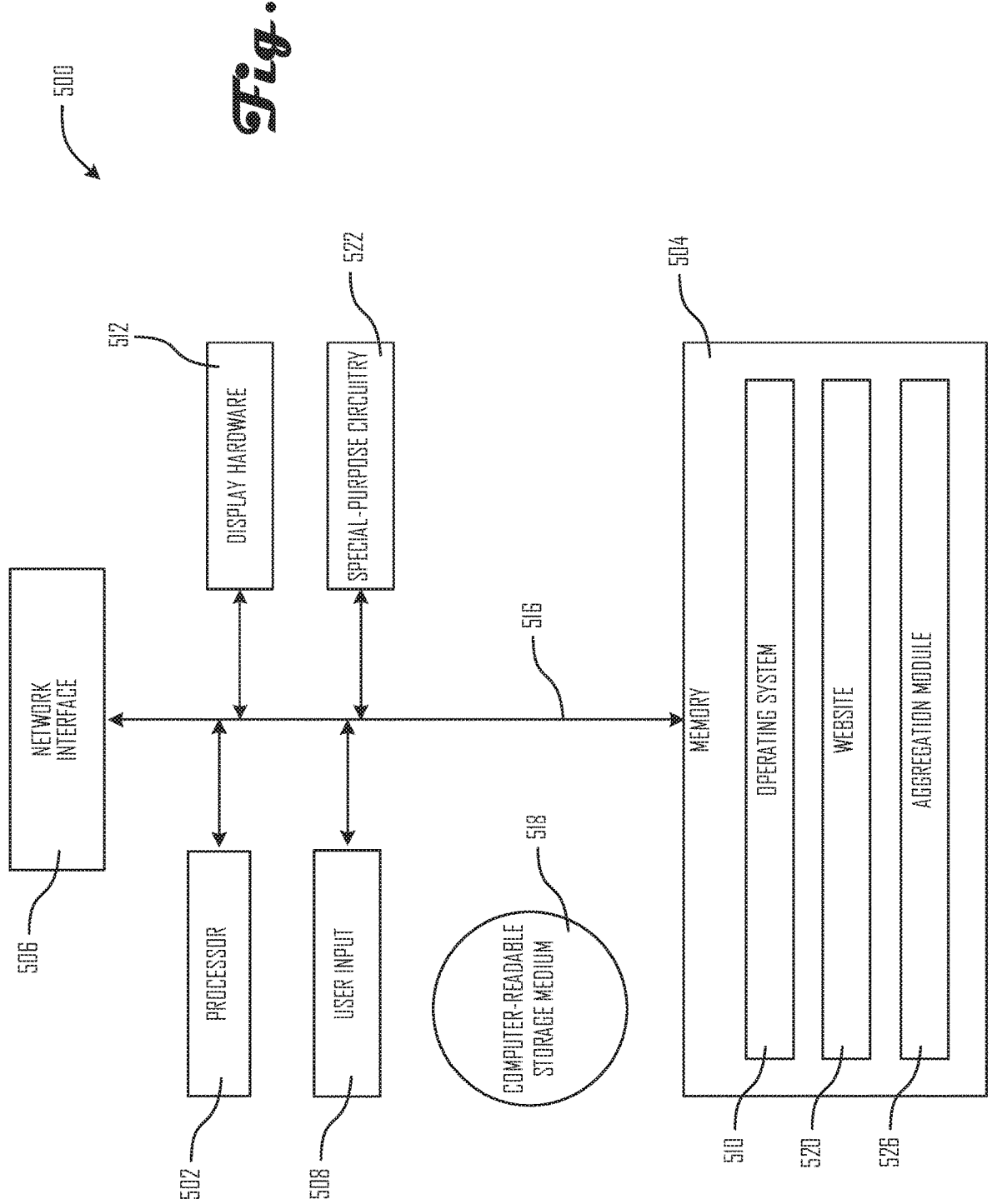
FIG. 5 depicts a server in which one or more improved technologies may be incorporated.

Referring now to FIG. 5, there is shown an exemplary server 500 like those of FIG. 2. Device 500 may include one or more instances of processors 502, memory 504, user inputs 508, and display hardware 512 all interconnected along with the network interface 506 via a bus 516. One or more network interfaces 506 allow device 500 to connect via the Internet or other networks to or within entities 210 of FIG. 2). Memory 504 generally comprises a random access memory ("RAM"), a read only memory ("ROM"), and a permanent mass storage device, such as a disk drive.

Memory 504 may contain one or more instances of operating systems 510, hosted websites 520, and aggregation modules 526. These and other software components may be loaded from a non-transitory computer readable storage medium 518 into memory 504 of the client device 500 using a drive mechanism (not shown) associated with a non-transitory computer readable storage medium 518, such as a floppy disc, tape, DVD/CD-ROM drive, flash card, memory card, or the like. In some embodiments, software components may also be loaded via the network interface 506, rather than via a computer readable storage medium 518. Special-purpose circuitry 522 may, in some variants, include some or all of the event-sequencing logic described below (e.g. in a peer-to-peer implementation) and one or more security features 560 (e.g. a firewall 189). In some embodiments client device 500 may include many more components than those shown in FIG. 5, but it is not necessary that all conventional components be shown in order to disclose an illustrative embodiment.

Figure 6:
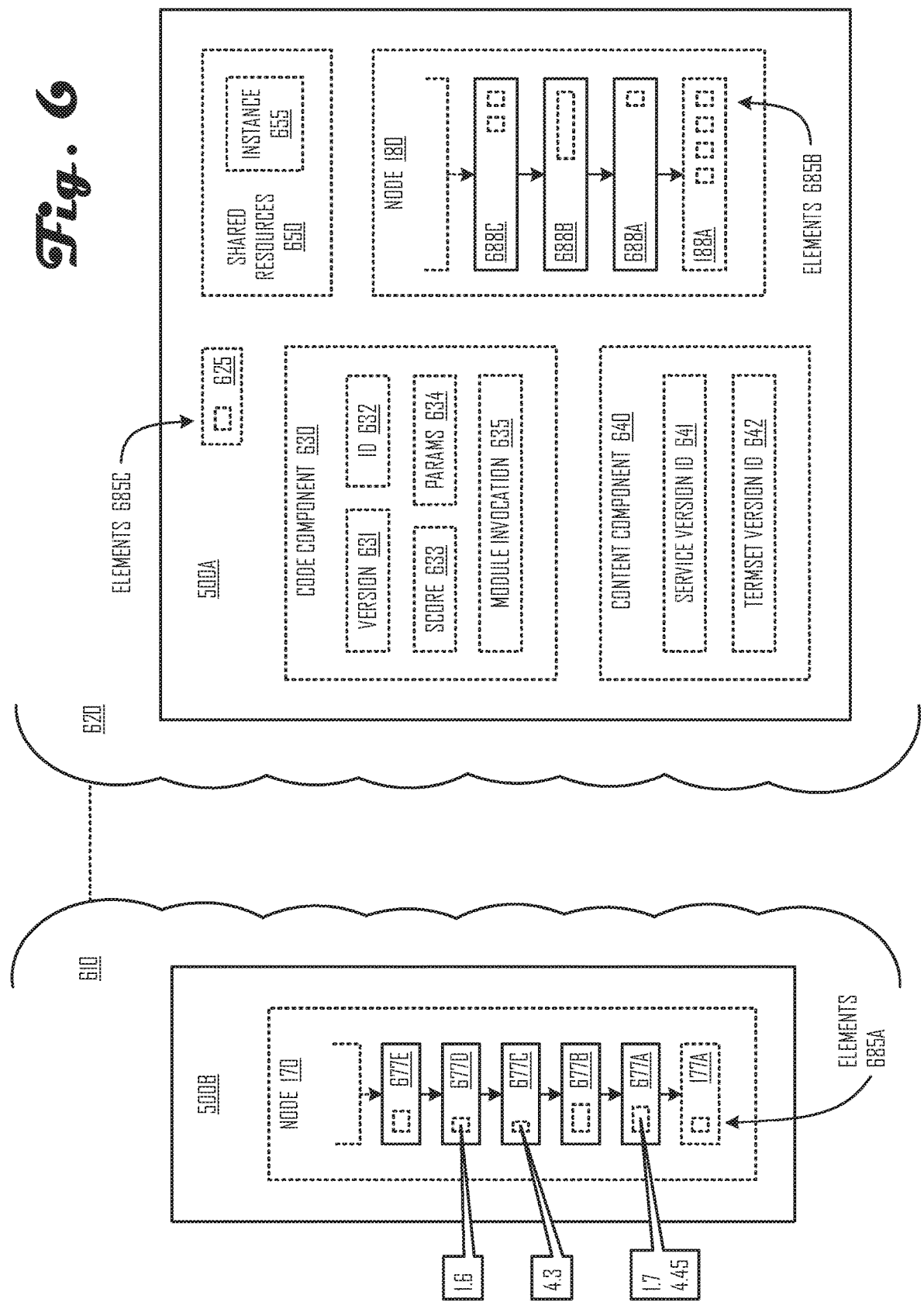
FIG. 6 depicts an earlier state of (a variant of) the system of FIG. 1.

FIG. 6 depicts an earlier state of (a variant of) the system 100 of FIG. 1, a configuration in which one or more servers 500A of a private or semi-private network (e.g. coinciding with entity 210A) interact with one or more servers 500B of a public or semi-public network 610 (e.g. coinciding with entity 210B). A (blockchain or other) distributed ledger node 170 shows the oldest block 177A thereof in FIG. 1 together with several of the preceding blocks 677A-E of the node. Most or all of these contain various elements 685A of interest in a permanent, public, verified, distributed arrangement. Likewise a private or other proprietary ledger node 180 shows the oldest block 188A thereof in FIG. 1 together with several of the preceding blocks 688A-C of the node. Most or all of these contain various elements 685B of interest in a permanent, secure arrangement that is at least partly accessible externally.

Such elements 685B may include one or more instances of smart contracts 625 or other code components 630 and in some variants may also include other content components 640 or shared resources 650 (or both) on-list as described herein. Such code components 630 may include one or more instances of routine or subroutine versions 631 (e.g. of device-executable code or source code thereof); of smart contract or other identifiers 632 (see FIG. 8); of trustworthiness-indicative or other scores 633 (e.g. pertaining to a code component 630 or an entity 210 that provides it); of Representation State Transfer protocol or other parameters 634; of timestamped (provenance data describing) module invocations 635 associated with such parameters 634; or of other data objects relating to executable code (e.g. transactions or other elements 685C of a smart contract 625) immutably recorded on chain. Such content components 640 may include one or more instances of service version identifiers 641 (e.g. identifying a most up-to-date version 631 of a code component 630), termset version identifiers 642 (e.g. identifying license terms or conditions in effect for a particular user at or before an execution as described herein), or other such timestamped data indelibly recorded in a ledger node 170, 180, 190. Such shared resources 650 may include built-in code (built-in subroutines called by some smart contracts 625) or a local instance 655 of a complete copy of a public ledger node 170, 190.

For example as described below, node 170 may reflect timestamped transitions from a service version identifier 641 of 1.5 just before block 677D to a service version identifier 641 of 1.6 in block 677D and several minutes later to a service version identifier 641 of 1.7 in block 677A as shown. Such service version identifiers 641 may pertain to all executions of a given module type (e.g. see FIG. 8) by a particular entity therebetween, for example. This can occur, for example, in a context in which a service type provenance would otherwise not be recorded on-chain without having access to the executions of the corresponding code component 630.

Likewise as further described below, node 170 may reflect timestamped transitions from a termset version identifier 642 of 4.2 just before block 677C to a termset version identifier 642 of 4.3 in block 677C and several minutes later to a termset version identifier 642 of 4.45 in block 677A as shown. Such transitions of termset version identifiers 642 may affect any and all executions of a given module type therebetween, for example, stating what priority will be applied or how utility tokens will be expended for the invocation of such execution. This can occur, for example, in a context in which public consensus could not otherwise be reached as to termset provenance (i.e. which license terms and conditions were in effect at the time of a particular execution of a code component).

Figure 7:
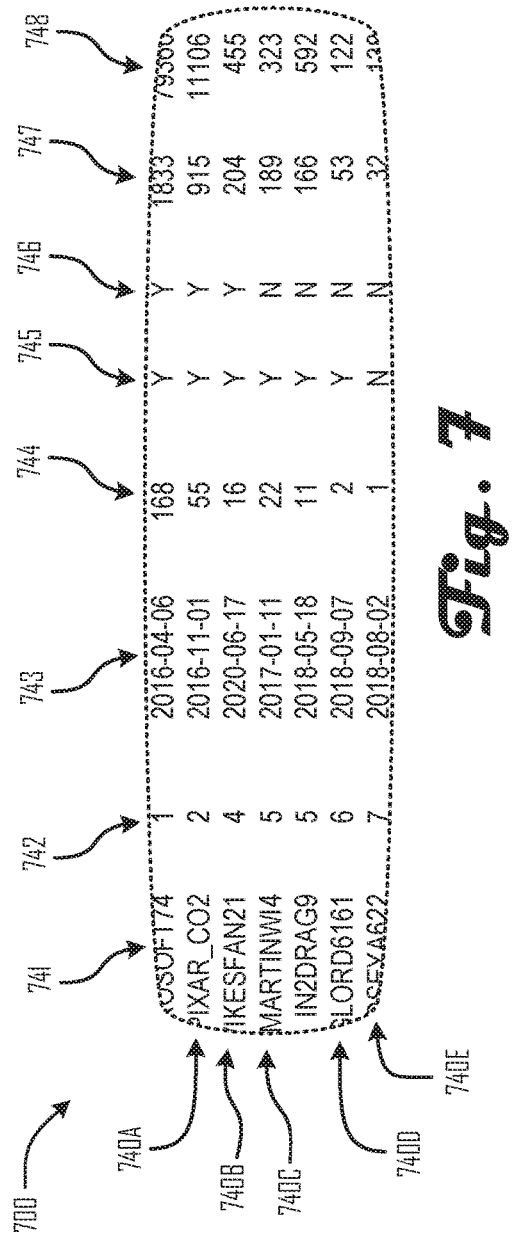
FIG. 7 depicts a media-resident record list in which one or more improved technologies may be incorporated.

FIG. 7 depicts a list 700 of records 740A-E each describing a (e.g. human) user or other content source 741 (e.g. a corporation or other entity 120). Each record 740 may include one or more instances of (privilege) tiers 741 (see FIG. 11); of dates 743 reflecting when that entity joined a cohort of users having privileges (e.g. according to the tiers 741) in some or all of network 620; of counts 744 (e.g. reflecting how many modules or versions have been uploaded by that entity); of (e.g. Boolean indications of) eligibility 745 for a lower privilege (e.g. posting a pictographic image or comment); of eligibility 746 for a higher privilege (e.g. posting a hyperlink or code component 630 so that it will be visible by other subscribers); of trustworthiness scores 747 (e.g. that increase over time at a variable rate absent suspicious behavior); of account balances 748 (e.g. of Dragon' tokens or other utility tokens as described below); or of other tracked attributes (e.g. profile parameters) of an entity 120 having privileges on one or more servers 500A of network 620. In some variants such balances 748 may affect how fast a (positive scalar or other quantification of) trustworthiness of a content source 741 may increase, which may trigger (e.g. upon reaching a host-specified threshold as described herein) trigger a corresponding privilege (e.g. a power to upload content components 640).

Figure 8:
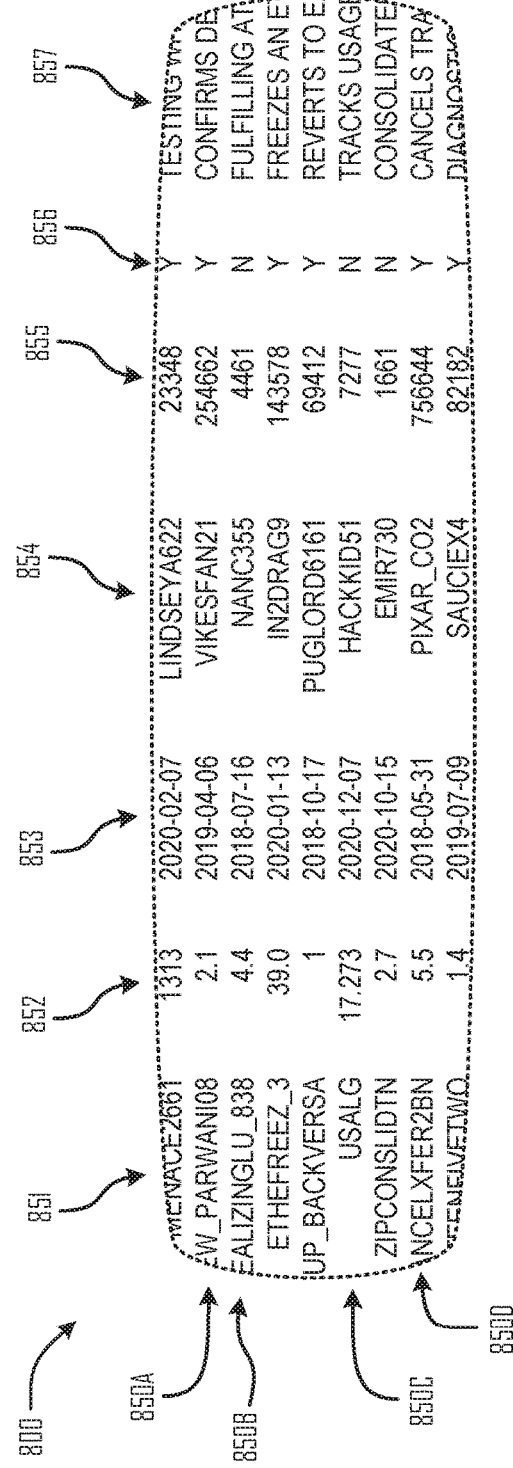
FIG. 8 depicts another media-resident record list in which one or more improved technologies may be incorporated.

FIG. 8 depicts a list 800 of records 850A-D each describing a smart contract or other device-executable code component 630 (e.g. in an inventory available to a particular user). Each record 850 may include one or more instances of alphanumeric or other module types 851; of alphanumeric or other version identifiers 852; of upload or release dates 853; of source identifiers 854 (e.g. corresponding to a content source 741 of list 700); of trustworthiness scores 855 (e.g. that increase over time ata variable rate absent suspicious behavior); of (Boolean indications of) suitability 856 for execution indicative of a high-enough trustworthiness (e.g. exceeding a threshold in effect for the particular user); of alphanumeric descriptors 857 describing each code component 630 (e.g. in a natural language) or version thereof; or of other tracked attributes (e.g. content components 640 in effect) of a code component 630 available for use on one or more servers 500A of network 620. In some variants such a current or recent balance 748 of a source 741 (e.g. with a source identifier 854 of "VIKESFAN21" in record 850A and record 740B) may affect how fast a (positive scalar or other quantification of) trustworthiness of a content component 640 is allowed to increase. This may trigger (e.g. upon reaching a host-specified threshold as described herein) a corresponding privilege (e.g. accessibility by or distribution to a larger cohort of users) for a given module or version 852.

Figure 9:
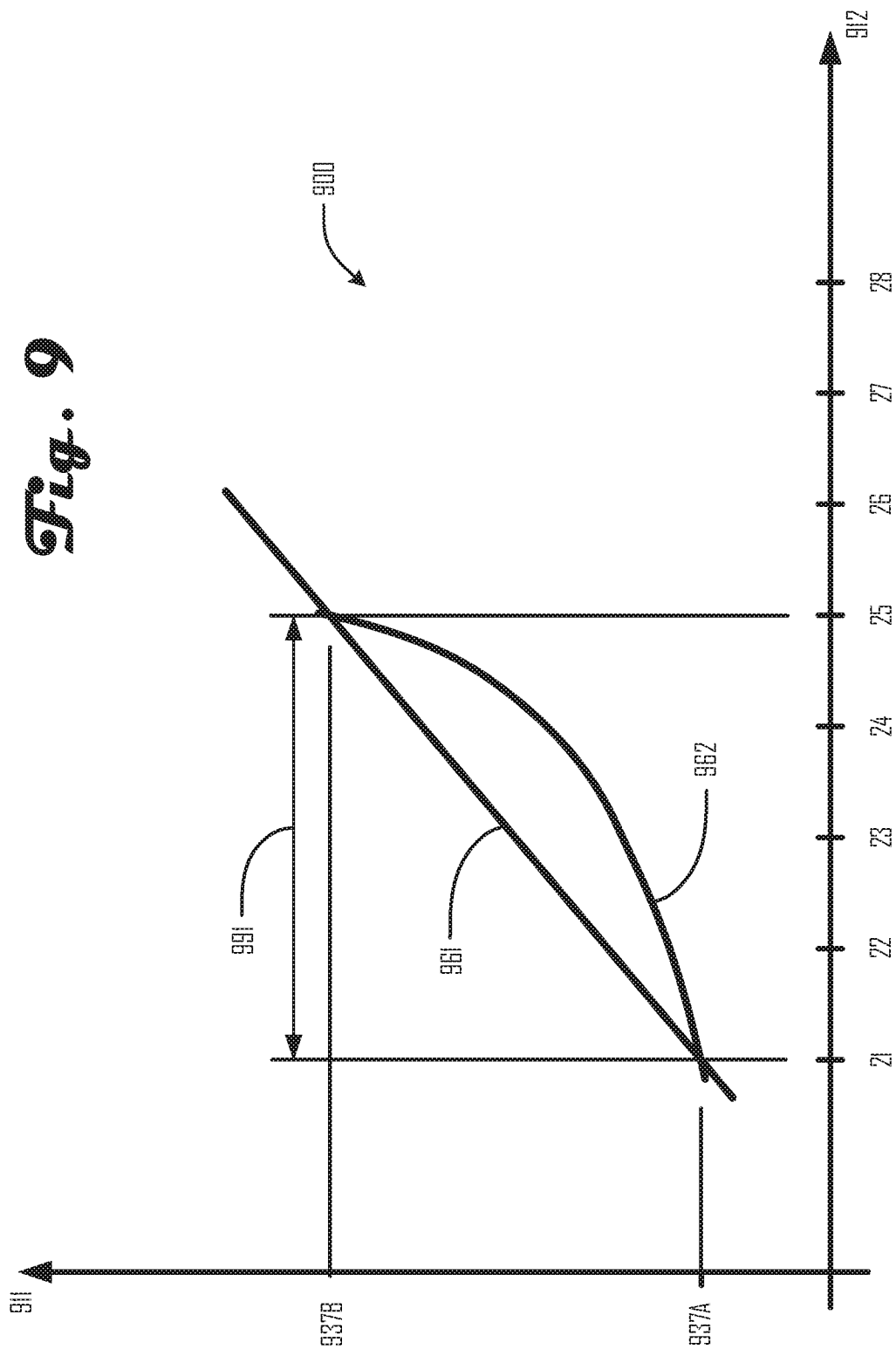
FIG. 9 is a plot showing how trustworthiness can increase over time in which one or more improved vetting technologies may be incorporated.

FIG. 9 exemplifies how (e.g. a scalar evaluation of) trustworthiness (e.g. of an entity or code component 630) can increase over time. A vertical axis 911 signifies a score 747, 855 (e.g. positively) indicative of trust plotted against a horizontal axis 912 signifying fixed units of time (e.g. days). A linear trajectory 961 shows trustworthiness increasing steadily from an initial value 937A to a threshold value 937B over a course of a few increments of time (e.g. from time 21 to time 25), wherein a privilege or other manifestation of status is bestowed (e.g. by one or more processors 502) upon reaching the threshold value 937B. In some variants an incremental increase or other manifestation of a slope of trajectory 961 may depend upon a current utility token balance 748 such that increasing the balance 748 incrementally decreases the interval 991 and decreasing the balance 748 incrementally increases the interval 991. In some variants an exponential, parabolic, hyperbolic, weighted polynomial, or other accelerating trajectory 962 may likewise quantify trustworthiness steadily increasing from initial value 937A to threshold value 937B over a course of the same interval 991. See FIGS. 11-12.

Figure 10:
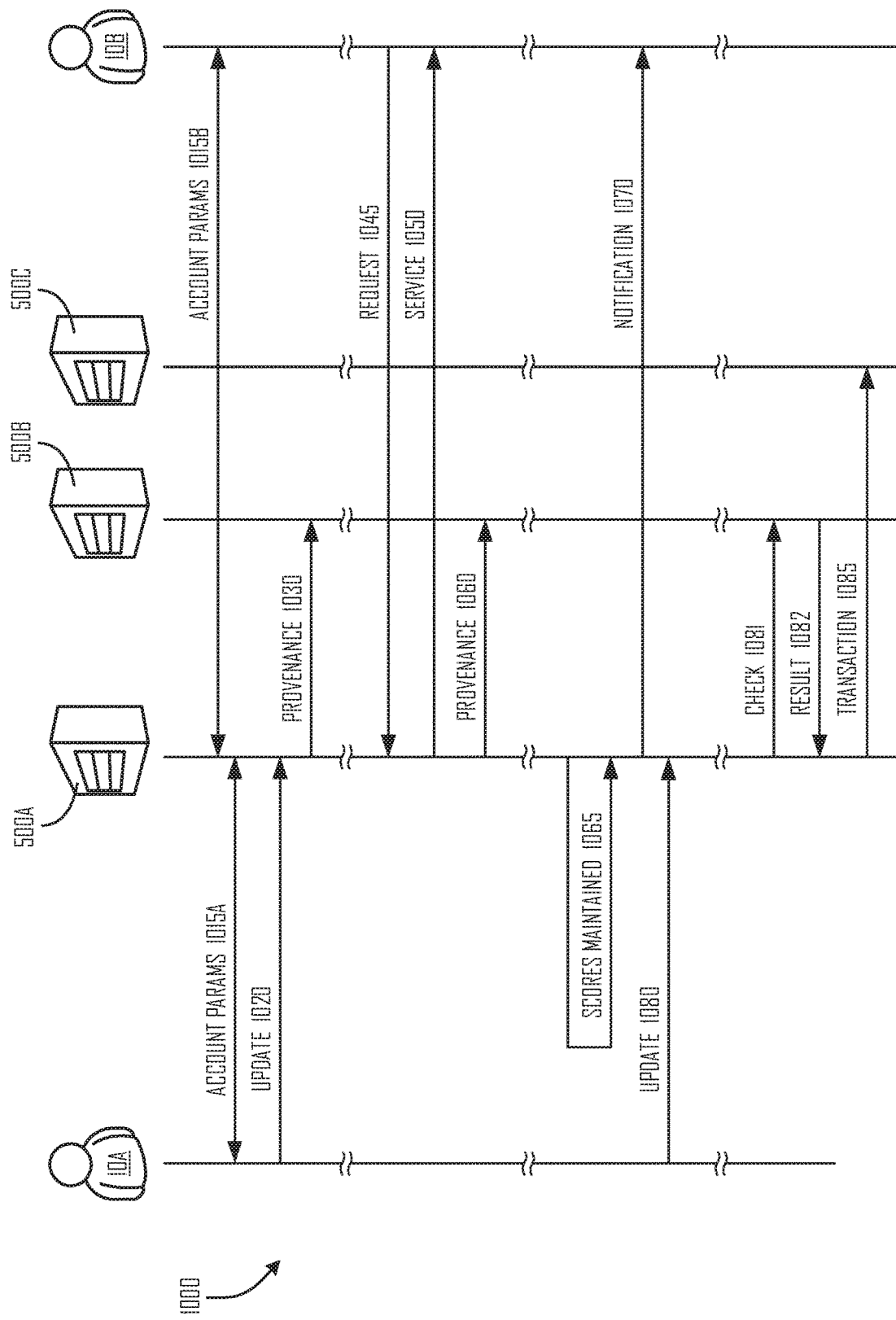
FIG. 10 depicts a particular scenario and progressive data flow in which client devices interact one or more servers according to one or more improved technologies.

FIG. 10 depicts a particular scenario and progressive data flow 1000 in which client devices 300 (operated by users or other human entities 10A-B) interact one or more servers 500A configured to control node 180, one or more servers 500B configured to facilitate access to node 170 (e.g. an Ethereum blockchain or other distributed ledger node featuring transaction-based state transitions and smart contract functionality), and one or more servers 500C configured to facilitate access to node 190 (e.g. a NEO blockchain or other distributed ledger node that supports code compiled into a secure executable environment). A coder or other human entity 10A configures a membership or similar account (e.g. on network 620) by establishing a profile and other account parameters 1015A. Likewise an execution requester or other human entity 10B configures a membership or similar account by establishing a profile and other account parameters 1015B as described herein.

Thereafter entity 10A uploads a smart contract update 1020 containing a smart contract or other device-executable code component 630 that becomes a definitive version 852 of that module type 851 upon recordation onto (a then-newest block 188A of) node 180. A corresponding code component update provenance 1030 (e.g. manifested as a hash function of block 188A or otherwise of content including code component 630) of that update 1020 is recorded onto a public node 170 (e.g. by one or more servers 500B thereof).

Some time later, a request 1045 for an execution of (whatever is the current version of) that module type 851 is sent from entity 10B (e.g. the "requester"). If status-related requirements (e.g. pertaining to privileges as described below) permit a grant of that request, an execution of the code component 630 commences (e.g. as service 1050) and a corresponding notification (of the grant) is sent. And a corresponding code component execution provenance 1060 (e.g. including one or more dispensations of any utility tokens 382 authorized by the requester and required for such execution) of that update 1020 is recorded onto a public node 170 (e.g. by one or more servers 500B thereof). In some variants, for example, such execution may include ongoing periodic or other multiple iterative component executions (e.g. every few hours or days) that effectively monitor one or more nodes 170 for the appearance of one or more defined phenomena of interest (e.g. transactions to or from a requester-specified digital wallet 366 that exceed a requester-specified event frequency).

Meanwhile scores 633, 747, 855 are updated or otherwise maintained 1065 (e.g. periodically in light of a current utility token balance 748). When such scores cross a threshold corresponding to an eligibility or other meaningful transition, a corresponding notification 1070 is sent to one or more entities 10B. When a smart contract update or other update 1080 occurs in relation to a code component 630 identified by an entity, in some variants that will trigger another such corresponding notification 1070.

If a smart contract service 1050 provides for iterative execution of a particular code component 630 that monitors one or more public nodes 170, a check 1081 of that node 170 (or a local instance 655 thereof) is initiated and a result 1082 is received (e.g. "Found" or "Not Found"). In some instances such results 1082 may be recorded to (e.g. a newest block of) or otherwise conditionally manifested as a transaction 1085 to another public blockchain (e.g. node 190).

FIG. 11 depicts a semi-log plot 1100 with additional quantified examples of how trustworthiness (e.g. of an entity 10) can be deemed to increase over time. A vertical axis 1111 signifies (a logarithmic plot of) a score 747 indicative of trust plotted against a horizontal axis 1112 signifying fixed units of time (e.g. in years). As reflected in the tiers 742 pertaining to respective entities in FIG. 7, a tier 742 of "1" corresponds to range 1101 of scores 747 above 1600. Likewise a tier 742 of "2" corresponds to range 1102 of scores 747 above 800. Likewise a tier 742 of "3" corresponds to range 1103 of scores 747 above 400. Likewise a tier 742 of "4" corresponds to range 1104 of scores 747 above 200. Likewise a tier 742 of "5" corresponds to range 1105 of scores 747 above 100. Likewise a tier 742 of "6" corresponds to range 1106 of scores 747 above 50. Intermediate trajectory 1161 reflects how an entity identified as (a username of) "PIXAR_CO2" might have risen from an initial score 747 below 50 (in 2016) linearly to a most recent score 747 above 800 in 2022. A much faster trajectory 1162 indicates a traversal of range 1105 that would have taken much less than a year. However a transition 1167 marks decelerating transition (e.g. a divestiture of a substantial majority of utility tokens) experience by a user called "VIKESFAN" in late 2020, so that the traversal of range 1105 (across interval 1179) was actually much slower, taking more than a year to a most recent score of 204.

FIG. 12 like exemplifies how trustworthiness increases (e.g. from an initial value 1237A to a threshold value 1237B-C) can be made faster or slower, depicting a score 855 (e.g. of a smart contract or other code component 630) can be deemed to increase over time 1212 (e.g. in incremental units 41-49 of an hour or a day). In some variants a logarithmic, parabolic, hyperbolic, weighted polynomial, or other decelerating trajectory 1261 may likewise quantify trustworthiness steadily increasing from an initial value 1237A (e.g. signifying a transition 1267) to a threshold value 1237C over an intermediate interval 1291 of a few hours or days. On a slower trajectory 1262 (e.g. corresponding to a lower balance 748), a score 855 of the code component traverses the same increase in an interval 1292 that is more than 10% longer (slower) than the intermediate trajectory 1261. Likewise on a faster-than-intermediate trajectory 1263 (e.g. corresponding to a higher balance 748), a score 855 of the code component 630 traverses the same increase in an interval 1293 that is more than 10% shorter (faster) than the intermediate trajectory 1261. Moreover it can be seen from FIG. 9 that the same variations can be implemented for accelerating or linear trajectories 961-962 as well.

FIG. 13 depicts special-purpose transistor-based circuitry 1300—optionally implemented as an ASIC or in a UI governance server, for example—in which some or all of the functional modules described herein may be implemented. Transistor-based circuitry 1300 includes one or more instances of sequencing modules 1331, for example, each including an electrical node set 1341 upon which informational data is represented digitally as a corresponding voltage configuration 1351. Transistor-based circuitry 1300 likewise includes one or more instances of sequencing modules 1332 each including an electrical node set 1342 upon which informational data is represented digitally as a corresponding voltage configuration 1352. Transistor-based circuitry 1300 likewise includes one or more instances of responsive modules 1333 each including an electrical node set 1343 upon which informational data is represented digitally as a corresponding voltage configuration 1353. Transistor-based circuitry 1300 likewise includes one or more instances of responsive modules 1334 each including an electrical node set 1344 upon which informational data is represented digitally as a corresponding voltage configuration 1354. Transistor-based circuitry 1300 likewise includes one or more instances of responsive modules 1335 each including an electrical node set 1345 upon which informational data is represented digitally as a corresponding voltage configuration 1355. In some variants, as described below in the clauses and claims, such a module implements such functionality jointly (e.g. in conjunction with other modules or processors 302 described herein). Alternatively or additionally, in some variants such modules (or components thereof) may be distributed (e.g. so that some are implemented in special-purpose circuitry 522 of respective servers 500) as described above.

FIG. 1400 illustrates an operational flow 1400 suitable for use with at least one embodiment, such as may be performed (in some variants) on one or more servers 500 using special-purpose circuitry 522. As will be recognized by those having ordinary skill in the art, not all events of information management are illustrated in FIG. 14. Rather, for clarity, only those steps reasonably relevant to describing the distributed ledger interaction aspects of flow 1400 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1410 describes recording one or more (device-executable code components 630, service version identifiers 641, terms version identifiers 642, or other) elements of a first version of a first smart contract privately on a first private blockchain (e.g. one or more sequencing modules 1331 in one or more servers 500A triggering a recordation of one or more elements 685B of a first version 631 of a first smart contract privately on node 180). This can occur, for example, in a context in which node 180 implements the first private blockchain, in which a timestamp of a block containing the entire first smart contract or a code component 630 thereof is manifested as a voltage configuration 1351 on node set 1341, in which version control of the first smart contract is maintained on the one or more servers 500A (e.g. on node 180); in which the one or more servers 500A are configured to disable and report on any actual or apparent instance of unauthorized activity discovered (e.g. by flagging the version and recording the discovery on node 180); in which the one or more servers 500A may suggest to a requesting entity 10B that an older version 852 of the same module type 851 may be used in response to data corruption or other indicia of defects resulting from an execution of one or more code components 630; in which insufficient termset-indicative or service-version-indicative metadata (or both) would otherwise be difficult to obtain in relation to a particular execution; in which a vulnerability in network 610 was first found by an enterprising discoverer (e.g. entity 10A); and in which the discoverer would otherwise be incentivized to exploit the vulnerability rather than report it.

Operation 1420 describes retrieving blockchain data in a first public blockchain by executing the first smart contract using one or more parameters that identify both the first public blockchain and the blockchain data to be retrieved (e.g. one or more sequencing modules 1332 of the one or more servers 500A initiating an execution of the first version 631 of the first smart contract and thereby retrieving the blockchain data using one or more parameters 634 that explicitly or otherwise identify both node 170 and the elements 685A to be retrieved from it). This can occur, for example, in a context in which node 170 implements the first public blockchain; in which the node data comprises one or more elements 685A of block 677A; in which an address of a local instance 655 of node 170 is manifested as a voltage configuration 1352 on node set 1342; in which the local instance 655 is kept current enough that the blockchain data is validly retrieved from the public node 170 (e.g. by updates of once or more per hour) even if the first smart contract really only ever reads from the local instance 655; and in which sequencing module 1332 invokes most or all of the responsive modules 1333-1335 described herein. This can occur, for example, in a context in which one or more responsive modules 1333 is configured to compute one or more scores 633, 747, 855 described above and to implement conditional privileges accordingly; in which resulting eligibilities 744-745 and suitabilities 856 (e.g. according to tiers 742 and threshold values 937, 1237 described herein) are thereby determined and manifested as a voltage configuration 1353 on node set 1343; and in which the special-purpose circuitry 1300 would not otherwise achieve a workable balance between expediting legitimate activity and disempowering mischief (e.g. trolling and other malicious activity).

Operation 1430 describes configuring a second smart contract to include a first transaction that is partly based on the blockchain data from the first public blockchain and partly based on a public ledger destination (e.g. one or more sequencing modules 1334 of the one or more servers 500A creating or adapting the second smart contract 625 to include one or more elements 685 in a transaction partly based on first public ledger node data from node 170 and partly based on an address of the public ledger destination). This can occur, for example, in a context in which the first public ledger node data includes one or more elements 685A of block 177A (as shown in FIG. 1); in which the public ledger destination comprises (a newest block 199 of) node 190; and in which the second smart contract 625 is assembled on one or more servers 500A of network 620.

Operation 1440 describes implementing the first transaction of the second smart contract partly based on the blockchain data from the first public blockchain and partly based on the public ledger destination (e.g. one or more sequencing modules 1335 of the one or more servers 500A implementing at least some of the second smart contract 625 include one or more elements 685C as the first transaction). This can occur, for example, in a context in which the public ledger destination includes node 170 (e.g. at block 177D); in which the first public ledger node data includes one or more elements 685A of block 177A (as shown in FIG. 1); and in which an inalterable version-controlled module type 851 (e.g. implementing the first smart contract or other built-in code component 630) could not otherwise be securely and selectively shared among users selectively (e.g. as a privilege described herein).

For example an instance of block 677E was recorded when a service version identifier 641 of a first smart contract was 1.5 and when a termset version identifier 642 of the first smart contract was 4.2 in a particular scenario relating to FIGS. 6 and 14. When block 677D was later recorded, a service version identifier 641 of the same smart contract became 1.6 (e.g. signifying a different version of the software implementing that smart contract). If an undesired and unforeseen problem is discovered by entity 10B in an output from the newer service version 1.6, an administrator of the one or more servers 500A may trigger a reversion to a prior service version state (e.g. version 1.5) or implement a new version 1.7 copied or adapted from earlier blocks (e.g. before block 677E) that is effectively the same as version 1.5 was. Likewise a termset version identifier 642 of the same smart contract became 4.3 upon block 677C being recorded. Such changes may signify a threshold 937, 1237 being adjusted, for example, or a utility token changing basis (e.g. from a unit of time to an instance of execution per token). If a complaint is received (e.g. reflecting an unexpected overcharge or misdirected token movement) in regard to terms or conditions of such service under version 4.3, an administrator of the one or more servers 500A may trigger a reversion to a prior termset version state (e.g. version 4.2) or implement a new version 4.45 copied or adapted from earlier blocks (e.g. before block 677E) that is effectively the same as version 4.2 was. Although the prior states of the service and termset versions are immutably recorded on node 180, they may remain private and readily available and, in some variants, may even be searchable within node 180.

In light of teachings herein, numerous existing techniques may be applied for configuring special-purpose circuitry or other structures effective for configuring and otherwise managing transactions and other operations as described herein without undue experimentation. See, e.g., U.S. Pat. No. 9,747,586 ("System and method for issuance of electronic currency substantiated by a reserve of assets"); U.S. Pat. No. 9,672,499 ("Data analytic and security mechanism for implementing a hot wallet service"); U.S. Pat. No. 9,646,029 ("Methods and apparatus for a distributed database within a network"); U.S. Pat. No. 9,569,771 ("Method and system for storage and retrieval of blockchain blocks using Galois fields"); U.S. Pat. No. 9,569,439 ("Context-sensitive query enrichment"); U.S. Pub. No. 20180183687 ("System and Method for Managing Services and Licenses Using a Blockchain Network"; U.S. Pub. No. 20180183606 ("Verifying Authenticity of Computer Readable Information Using the Blockchain"; U.S. Pub. No. 20180167198 ("Trust Enabled Decentralized Asset Tracking for Supply Chain and Automated Inventory Management"; U.S. Pub. No. 20180157825 ("Systems and Methods for Determining Trust Levels for Computing Components Using Blockchain"; U.S. Pub. No. 20180129955 ("Hybrid Blockchain Data Architecture for use Within a Cognitive Environment"; U.S. Pub. No. 20170364698 ("Fragmenting data for the purposes of persistent storage across multiple immutable data structures"; U.S. Pub. No. 20170287090 ("System and method for creating and executing data-driven legal contracts"; U.S. Pub. No. 20170116693 ("Systems and Methods for Decentralizing Commerce and Rights Management for Digital Assets Using a Blockchain Rights Ledger"; U.S. Pub. No. 20170109668 ("Model for Linking Between Non-consecutively Performed Steps in a Business Process"; U.S. Pub. No. 20170109639 ("General Model for Linking Between Nonconsecutively Performed Steps in Business Processes"; U.S. Pub. No. 20170109638 ("Ensemble-Based Identification of Executions of a Business Process"); U.S. Pub. No. 20160260095 ("Containerized Computational Task Execution Management Using a Secure Distributed Transaction Ledger"); U.S. Pub. No. 20130061288 ("Method for controlling trust and confidentiality in daily transactions of the digital environment"); U.S. Pub. No. 20120095908 ("Distributed Computing for Engaging Software Services"); U.S. Pub. No. 20120020476 ("Method for Performing a Cryptographic Task in an Electronic Hardware Component"); and U.S. Pub. No. 20100332336 ("System and method for electronic wallet conversion").

Although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (e.g. with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

1. A distributed public ledger interaction system comprising:

transistor-based circuitry (e.g. one or more sequencing modules 1331 of transistor-based circuitry 1300) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (e.g. 2) so as to configure a second smart contract (e.g. comprising another instance of device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

2. The system of Clause 1, wherein all of the transistor-based circuitry 1300 is implemented on a single application-specific integrated circuit (ASIC).

3. The system of Clause 1, wherein the transistor-based circuitry 1300 is distributed across two or more mutually remote facilities.

4. The system of Clause 1, wherein the public ledger destination identifies the first public ledger node.

5. The system of Clause 1, wherein the public ledger destination identifies a second public ledger node.

6. The system of ANY one of the above system clauses, wherein the transistor-based circuitry configured to execute the first version 631 of the first smart contract comprises:

transistor-based circuitry configured to condition an execution of the first version 631 of the first smart contract upon a first trustworthiness indication (e.g. a score 633 along a trajectory that generally increases with time) reaching an execution trust requirement (e.g. a threshold 1237), wherein a first entity is associated with the execution trust requirement upon a completion of a first temporal interval that depends upon a utility token balance 748 of the first entity during the first temporal interval 1291, wherein a second entity is associated with the execution trust requirement upon a completion of a second temporal interval that depends upon a utility token balance 748 of the second entity during the second temporal interval 1292, wherein a third entity is associated with the execution trust requirement upon a completion of a third temporal interval 1293 that depends upon a utility token balance 748 of the third entity during the third temporal interval, and wherein all of the temporal intervals 1291-1293 are negatively correlated with the utility token balances (e.g. each to a corresponding one of the utility token balances so as to associate steeper trust increases with larger token balances).

7. The system of ANY one of the above system clauses, wherein the transistor-based circuitry configured to execute the first version 631 of the first smart contract comprises:

transistor-based circuitry configured to condition an execution of the first version 631 of the first smart contract upon a first trustworthiness indication (e.g. score 747 or score 855) reaching a threshold value 937 wherein a first entity (e.g. identified as "VIKESFAN21") achieves an execution trust requirement in a first temporal interval 1291

(having a duration that is) negatively correlated with a utility token balance 748 of the first entity during the first temporal interval 1291, wherein negative correlation signifies that a second entity is associated with the execution trust requirement in a second temporal interval 1292 that is longer than the first temporal interval 1291 because the second entity has had a lower utility token balance 748 than the utility token balance 748 of the first entity during the first temporal interval 1291, and wherein a third entity is associated with the execution trust requirement in a third temporal interval 1293 that is shorter than the first temporal interval 1291 because the third entity has had a higher utility token balance 748 than the utility token balance 748 of the first entity during the first temporal interval 1291.

8. The system of ANY one of the above system clauses, wherein the transistor-based circuitry configured to execute the first version 631 of the first smart contract comprises:

transistor-based circuitry configured to condition an availability notification 1070 of the first version 631 of the first smart contract upon a first trustworthiness indication wherein the first version 631 achieves an availability notification trust requirement (e.g. a threshold 1237) in a first temporal interval 1291 negatively correlated with a utility token balance 748 (e.g. wherein an aggregate balance decreasing tends to lengthen the time interval in a stepwise or monotonic fashion) of a source 741 of the first version 631 during the first temporal interval 1291.

9. The system of ANY one of the above system clauses, wherein the private ledger node resides on one or more private servers 500B of a private or hybrid-private network 620 wherein one or more (instances of) application-type code components 630 are configured to be initiated only by an expenditure of one or more special-purpose utility tokens 382 (e.g. Dragon™ tokens as described below).

10. The system of ANY one of the above system clauses, wherein the private ledger node 180 resides on one or more private servers 500B wherein one or more (instances of) application-type code components 630 are configured to be initiated only by an expenditure of one or more special-purpose utility tokens 382 and wherein at least one of the one or more special-purpose utility tokens 382 includes a first embedded license term in a smart contract codifying one or more requirements that a request 1045 must fulfill before a particular service 1050 identified by the request may be accessed.

11. The system of ANY one of the above system clauses, wherein the private ledger node resides on one or more private servers 500B configured so that one or more (e.g. instances of) code components 630 are impossible for a particular user (e.g. a member or other entity 10B) to initiate directly through any payment tokens (e.g. Bitcoin or similar cryptocurrencies) but in which the particular user can initiate (an execution of) at least one of the one or more code components 630 by expending some number of special-purpose utility tokens 382 (e.g. Dragon™ tokens as described below) owned by the particular user.

12. The system of ANY one of the above system clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

13. The system of ANY one of the above system clauses, wherein the one or more elements 685B of the first version 631 of the first smart contract are recorded "privately" insofar that a complete copy of the first private ledger node resides on a network 620 that is owned by a single private entity.

14. The system of ANY one of the above system clauses, wherein the one or more elements 685B of the first version 631 of the first smart contract are recorded "privately" insofar that the first public ledger node (e.g. node 170) and the first private ledger node (node 180) are separated by a firewall 189.

15. The system of ANY one of the above system clauses, further comprising: a physical article implementing a digital wallet 366 configured to receive one or more special-purpose utility tokens 382 upon an execution of the second smart contract.

16. The system of ANY one of the above system clauses, further comprising: a physical article implementing a digital wallet 366 that includes crypto assets 373 (e.g. utility tokens or cryptocurrency) that can later be used by an owner of the digital wallet 366.

17. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node 190, wherein the first public ledger node data includes a first service version identifier 641 (e.g. becoming a service version 1.7 by virtue of one or more elements 685A in block 677A), and wherein the prior public ledger node data includes a prior service version identifier 641 (having been a service version 1.5 just before block 677D and service version 1.6 by virtue of one or more elements 685A in block 677D).

18. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first termset version identifier 642 (e.g. becoming a termset version 4.45 by virtue of one or more elements 685A in block 677A) and wherein the prior public ledger node data includes a prior termset version identifier 642 (e.g. updating from termset version 4.2 to termset version 4.3 by including an element 685A of 4.3 in a transaction of a new block 677C).

19. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first service version identifier 641 and a first termset version identifier 642 and wherein the prior public ledger node data includes a prior service version identifier 641 and a prior termset version identifier 642.

20. The system of System Clause 1, wherein the transistor-based circuitry configured to execute the first version 631 of the first smart contract comprises:

transistor-based circuitry (e.g. as an instance of special-purpose circuitry 522) configured to execute the first version 631 of the first smart contract so as to retrieve the first public ledger node data in the first public ledger node so as to detect a first parametric update (e.g. one or more versions 631 or other elements 685A of blocks 677 changing) therein relative to prior public ledger node data (e.g. as shown in FIG. 6).

21. The system of ANY one of the above system clauses, wherein the transistor-based circuitry 1300 is also configured to perform one or more methods described below.

22. A distributed public ledger interaction method comprising: invoking transistor-based circuitry (e.g. one or more sequencing modules 1331) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and invoking transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (2) so as to configure a second smart contract 625 (e.g. comprising a data-transformative instruction set or some other instance of a device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

23. The method of Clause 22, wherein the public ledger destination identifies the first public ledger node.

24. The method of Clause 22, wherein the public ledger destination identifies a second public ledger node.

25. The method of Clause 22, wherein said distributed ledger destination implements a serverless architecture blockchain platform (e.g. as described below in Appendix B).

26. The method of Clause 22, wherein the public ledger destination identifies (at least) the first public ledger node and a second public ledger node.

27. The method of ANY one of the above method clauses, wherein the private ledger node 180 resides on one or more private servers 500B wherein one or more (instances of) application-type code components 630 are configured to be initiated only by an expenditure of one or more special-purpose utility tokens 382.

28. The method of ANY one of the above method clauses, wherein at least one of the one or more special-purpose utility tokens 382 determine one or more elements 685B (e.g. an embedded license term defining a request format or smart contract initiation protocol) that a request 1045 must contain before a particular service 1050 identified by the request may be received.

29. The method of ANY one of the above method clauses, wherein the invoking transistor-based circuitry configured to execute said first version 631 of said first smart contract comprises (at least) iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

30. The method of ANY one of the above method clauses, wherein the first private ledger node resides on one or more private servers 500 configured so that one or more (e.g. instances of) code components 630 are impossible for a particular entity 10B to invoke (e.g. trigger an execution of) directly through any payment token (e.g. plentiful Bitcoin owned by the particular entity 10B and available) but in which the particular entity 10B can initiate (an execution of) at least one of the one or more code components 630 by expending some number of special-purpose utility tokens 382 (e.g. a quantity of "Dragons" as described below) owned by the particular entity 10B.

31. The method of ANY one of the above method clauses, wherein the second smart contract 625 is a data-transformative instruction set.

32. The method of ANY one of the above method clauses, wherein the second smart contract 625 contains a special-purpose license that is maintained on the public ledger destination via a consensus-based distributed authentication protocol (e.g. in a block of a blockchain), wherein the special-purpose license is configured to control access to another (instance of) code component 630.

33. The method of ANY one of the above method clauses, wherein the public ledger destination maintains a rights provenance for a particular execution of the first smart contract (e.g. as version identifiers or other elements 685A).

34. The method of ANY one of the above method clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

35. The method of ANY one of the above method clauses, wherein the invoking transistor-based circuitry configured to execute the first version 631 of the first smart contract comprises:

transmitting a result of the first transaction of the second smart contract (e.g. transaction 241) partly based on the first public ledger node data from the first public ledger node and partly based on the public ledger destination being implemented to one or more mining rig nodes 400G-H.

36. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted.

37. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that includes a particular request format that must be used for the request 1045 to be granted.

38. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a stateless protocol is used as the smart contract initiation protocol.

39. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a Representation State Transfer protocol is used as the smart contract initiation protocol.

40. The method of ANY one of the above method clauses, wherein the invoking transistor-based circuitry configured to execute the first version 631 of the first smart contract comprises:

iteratively monitoring one or more public nodes 170 for one or more requester-specified phenomena of interest, wherein the one or more requester-specified phenomena of interest include first and second asset transfers from a requester-specified digital wallet 366.

41. The method of ANY one of the above method clauses, wherein the invoking transistor-based circuitry configured to execute the first version 631 of the first smart contract comprises:

iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

42. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

43. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

44. The method of ANY one of the above method clauses, wherein the invoking the transistor-based circuitry configured to record the one or more elements 685B of the first version 631 of the first smart contract comprises:

recording an entirety of the first version 631 of the first smart contract with metadata describing the first version 631 of the first smart contract all in a single block of the first private ledger node 170, wherein the metadata includes an alphanumeric identifier 632 of the first smart contract, wherein the metadata includes a then-current score 633 of the first smart contract, wherein the metadata includes a natural language description of one or more parameters 634 with which the first smart contract may be executed, and wherein the metadata includes a required tier 742 or other quantification that a requester must satisfy to be eligible to initiate an execution of the first smart contract.

45. The method of ANY one of the above method clauses, wherein the invoking transistor-based circuitry configured to execute the first version 631 of the first smart contract comprises:

iteratively executing the first transaction of the second smart contract on an ongoing periodic basis.

46. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per week.

47. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per day.

48. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest.

49. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include a transaction pertaining to a requester-specified digital wallet 366.

50. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366.

51. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366 with a frequency of occurrence that exceeds a requester-specified frequency threshold (e.g. daily).

52. The method of ANY one of the above method clauses, wherein a Dragon™ token as described below is used as a utility token 382 so as to invoke (an execution of) the first version 631 of the first smart contract.

53. The method of ANY one of the above method clauses, wherein a Dragon™ token as described below is used as a utility token 382 so as to invoke (at least) the first transaction of the second smart contract.

54. The method of ANY one of the above method clauses, wherein each expenditure of one or more utility tokens 382 by an entity 10A who supplies the first smart contract increases a time interval 991, 1291 until that entity obtains an eligibility 745, 746.

55. The method of ANY one of the above method clauses, wherein each expenditure of one or more utility tokens 382 by an entity 10B who requests a service 1050 that includes executing the first smart contract increases a time interval 991, 1291 until that entity obtains an eligibility 745, 746.

56. The method of ANY one of the above method clauses, wherein each expenditure of one or more utility tokens 382 by an entity 10A who supplies a (code component 630 or other) content component 640 increases a time interval 991, 1291 until the content component 640 obtains an eligibility (e.g. becoming associated with an affirmative Boolean indication of suitability 856).

57. The method of ANY one of the above method clauses, further comprising:
implementing an interchain interaction system 100 like that depicted in FIG. 1.

58. The method of ANY one of the above method clauses, further comprising:
transmitting a result of the second smart contract to a cryptographically secured handheld digital wallet 366 like that of FIG. 3.

59. The method of ANY one of the above method clauses, further comprising:
implementing an interchain interaction system having smart contracts 625 and other shared resources 650 like those depicted in FIG. 6.

60. The method of ANY one of the above method clauses, further comprising:
implementing an interchain interaction system using a media-resident record list 700 like that of FIG. 7 to characterize respective human entities 10.

61. The method of ANY one of the above method clauses, further comprising:
implementing an interchain interaction system using a media-resident record list 800 like that of FIG. 8 to characterize respective version-controlled types of code components 630.

62. The method of ANY one of the above method clauses, further comprising:
implementing a conditional notification 1070 to an entity 10B who has requested and received a service 1050 as depicted in FIG. 10.

63. The method of ANY one of the above method clauses, further comprising:
implementing a conditional notification 1070 like that of FIG. 10.

64. The method of ANY one of the above method clauses, further comprising:
implementing a scoring system to imbue an entity 10B who has requested and received a service 1050 with an accelerating evaluation of trustworthiness (concave up, as shown) as depicted in trajectory 962 of FIG. 9.

65. The method of ANY one of the above method clauses, further comprising:
implementing a scoring system to imbue a code component 630 with an evaluation of trustworthiness (e.g. quantified as a current score 855) growing with time at a rate (steepness) that depends upon a token balance 748 of an entity 10A who supplied the code component as depicted in FIGS. 11-12.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Appendix A: DRAGONCHAIN ARCHITECTURE

The purpose of this document is to outline and communicate the architecture and design of a blockchain platform which will allow ease of integration for real business applications. In the author's opinion, there is a growing need for simplified blockchain integration. The decentralized and singular approach to blockchain implementation is sometimes at odds with the real business need to protect information and control business processes. This document seeks to shed light and provide examples for the successful implementation of enumerated blockchain architectural elements.

ARCHITECTURAL GOALS

1. Ease of integration of existing systems
2. Ease of development for traditional engineers and coders unfamiliar with blockchain, distributed
systems, and cryptography
3. Client server style and simple RESTful integration points for business integration
4. Simple architecture (flexible and usable for unforeseen applications)
5. Provide protection of business data by default
6. Allow business focused control of processes
7. Fixed length period blocks
8. Short/fast blocks
9. Currency agnostic blockchain (multi-currency support)
10. No base currency
11. Interoperability with other blockchains public and private
12. Adoption of standards as they become available see W3C Blockchain Community Group blockchain standardization and Disney Blockchain Standardization Notes

ARCHITECTURAL ELEMENTS

ABSTRACTION OF PROOF

In Bitcoin and most other cryptocurrencies, we witness the use of "Proof of Work" (PoW) algorithms as a basis for consensus in a "trustless" system. In this architecture, "proof" will be abstracted and may be implemented in one or more ways for a given blockchain. For some uses, one may desire to use a trust based system, for instance, in a fully private ledger node system. One may also find value in a hybrid proof configuration that would see trust applied alongside limited Proof of Work to add additional security against attack (e.g. in some variants a potential attacker would not only need to compromise or attain a set of private keys, but would also need to perform computation to accomplish the configured Proof to reassemble a given blockchain.

Proof Implementations:
    1. Trust (Default)
    2. Proof of Work (PoW)
    3. Proof of Stake (PoS)
    4. Other as yet determined algorithms Given such an abstraction, a user would be able to configure one or more simultaneous proofs to suit business need, whilst a system developer may build new proof implementations as blockchain technology progresses.

It is possible to conduct PoW even in the case of fixed time length block constructions (see block construction discussion elsewhere in this paper) by spanning one or more proof implementations across blocks. As an example, let's say that we have a particular use case that requires higher than normal security. If we assume that Trust is implemented by default, but we desire to configure some amount of trustless verification, we may wish to configure some level of Proof of Work on our blockchain. Depending upon the difficulty level configured, and given the nature of PoW algorithms, we may not see a PoW solution for every block. Some blocks would have no PoW, and the PoW answer may only appear occasionally. In such a case, it may be reasonable to configure two or more levels of PoW. A higher difficulty proof may be tuned to appear approximately every 20 minutes, and a lower difficulty proof may be tuned to appear approximately every 2 seconds. In the same manner other proofs such as PoS may be applied simultaneously within a single chain. An interesting philosophical point is that such proofs may be used in competition against a future attacker rather than as competition with other miners for a block reward.

CHECKPOINTING AND PROOF OF EXISTENCE

Another element in the abstraction of proof is the further ability to hybridize by checkpointing into other (public) blockchains. This can be seen as a first level or simple interoperability between blockchains, public or private. Of particular potential value, is the ability to ascertain risk by measuring a public ledger node's attributes. That is, if tied to a public ledger node which uses PoW such as Bitcoin, the system can estimate the amount of hashpower that has been applied since the checkpoint and even extrapolate that compute power to dollars spent. With this, a risk unit may be developed that shows how much compute power would be needed (and how much that would cost) to calculate the percentage likelihood of success in an attempt to counterfeit a given artifact (e.g. a transaction of high value). In the same manner, tying a checkpoint to a public ledger node based on PoS, the system could measure the amount of assets that must be held (and likely sacrificed) in order to counterfeit the transaction in question. See discussion of Level 5 verification below for more information.

TRANSACTION DEFINITION

A transaction is the basis with which all events or data transfers are recorded within the blockchain platform. The system should define a flexible and extensible standardized transaction structure.
Implementations options:
> JSON with standardized structure
> JWT (JSON Web Token)
> Other encoded structure (with supporting libraries in multiple languages)

HEADER

> Contains system or network defined standard standard metadata fields for the transaction.
> Example fields:
> Transaction ID
> Transaction type
> Transaction class
> Create timestamp
> Transaction timestamp
> Origin ID
> Business organization and/or organization taxonomy
> Actor
> Entity

PAYLOAD

Arbitrary structure and content, defined at the business level and implemented or controlled within the level 1 approval code.
Some level of structure within the payload (e.g. fields and structures) may be implemented as networkwide
templates to be utilized and noted based upon the optional transaction class header field. This will allow nodes to implement some needed behavior defined at the Enterprise or network level, as well as simplification of capabilities such as currency. See below for examples of transaction class.

SIGNATURE

Portion of the transaction holding a cryptographic signature to allow parties to prove the source and/or that the contents of the transaction are unaltered since the signing (i.e. tamper evident). The signature within the transaction should not be required from the transaction source (e.g. client or 3rd party system) as some clients may not be cryptographically enabled or aware of the blockchain platform. Alternatively, a client system may for example invoke a process of multi-party signing prior to transaction submission. Either way, the blockchain platform node's Transaction Service component should cryptographically sign any inbound transaction that it accepts for processing (with its configured key pair).

Perceived requirements:
- The structure should allow for multi-party and nested signings
- The signature should hash all fields within the signature structure itself minus hash and signature
- to make the signature itself tamper evident
- The structure should see re-use in the verification record (block verification) signing process Fields:
- Signatory
- Hash
- Stripped Hash *(for transaction signatures only - a hash of the full transaction with the payload stripped - to allow level 2+ nodes to validate a transaction even when the payload is not available)*
- Public Key
- Signing Timestamp
- Signature
- Child Signature *(optional)*

Implementation options:
- JWS (JSON Web Signature)
- Custom JSON

CLASSES

Some examples of possible transaction classes are:
- Default *(custom Level 1 business payload structure)*
- Currency
- Provisioning
- Network communications
- Marketplace transaction
- Information interoperability *(foreign blockchain currency or information payload)*

BLOCK DEFINITION

Block definition may see multiple implementations, although there are more or less common elements involved such as:
- Block ID
- Timestamp
- Transactions
- Hash of prior block
- Proof *(e.g. PoW, PoS) artifact*
- Signature
- Block period
- Verification attributes An interesting part of block definition design that is often not considered of is the question of *when* the block is formed. In Bitcoin or other PoW systems, a block is formed when the PoW algorithm is solved for the current network difficulty. This may happen after 30 seconds or 30 minutes. It is variable and random, but the network seeks to tune the difficulty in order to tune the average block time to 10 minutes.

In trust based systems, there would be no absolute need to maintain a variable time based block. In many real world systems, it is in fact seen as a detriment to its use that Bitcoin cannot offer a fixed or faster average block time. In this architecture, we may desire a more appropriate block time, such as a fixed time in seconds (e.g. 5 seconds). The definition of such fast and fixed block times leads to a question of consensus, that is, how does the entire network come to consensus every 5 seconds? With context based verification and the concept of a "blockchain of blockchains" (discussed below), the system comes to gradual consensus with risk controlled by individual business users.

VERIFICATION AND CONSENSUS

We introduce here the concept of "context based verification" to the blockchain discussion. To illuminate, consider Bitcoin or any other existing blockchain implementation. They primarily use a set proof algorithm (e.g. PoW) to assemble blocks over time and to come to consensus over which blocks and which chain is the common, agreed truth.

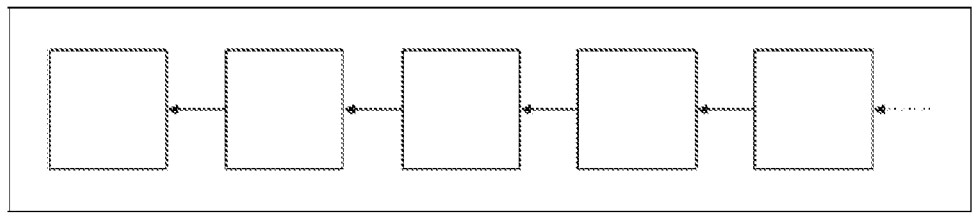

VANILLA BLOCKCHAIN STRUCTURE IS ONE DIMENSIONAL

In Dragonchain, with context based approval, we add another dimension to that design. So the first level is achieved in a purely business context, that is with business logic implemented to provide transaction approval and system logic to arrange those transactions into blocks which are chained together. These blocks will have an abstract proof integrated such as PoW, PoS, or trust. This first level of verification can be considered as analogous to other blockchains.

It is when other verification contexts are added that we see added value to even trust based systems. Any given node should ideally allow configuration to support or execute one or more of the verification phases described below.

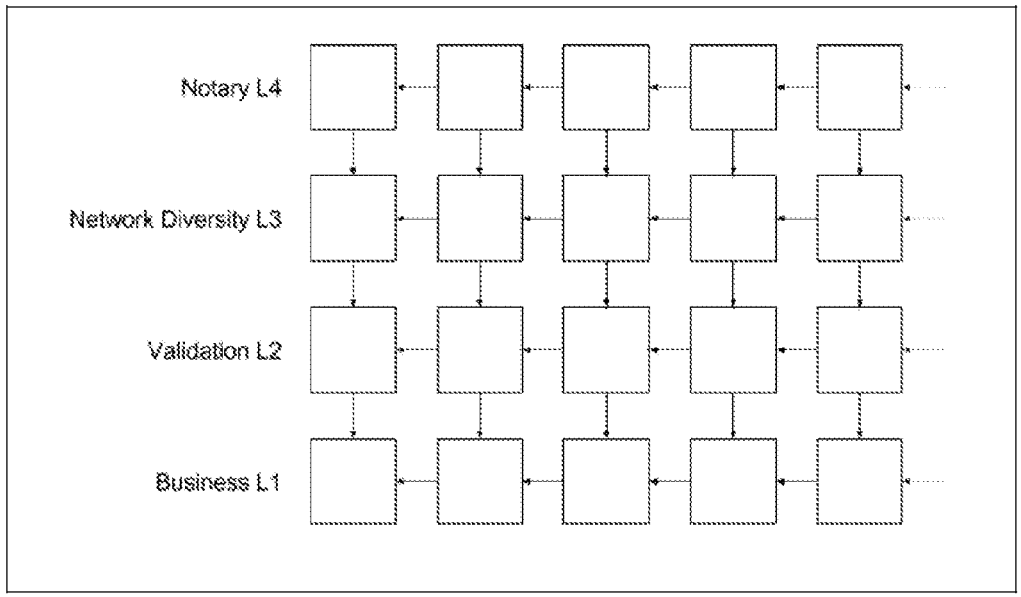

DRAGONCHAIN STRUCTURE IS LINKED BETWEEN BLOCKS AND VERIFICATION CONTEXTS

LEVEL 1 - BUSINESS (APPROVAL) VERIFICATION

Approval functionality is implemented and configured by the business integrator. This is the placement for integration of "real world" value. Business logic defined by an organization or blockchain platform user is configured to be executed by a blockchain node.

Here also is where the transaction payload is defined by the business to be what is needed for their purposes.

Transactions are arranged and passed to the provided business logic which will determine approval or denial. Approved transactions will be assembled into a "block" generically referred to as a "verification record".

The payload field of every transaction may be stripped before or after assembling the final block in order to maintain control of the distribution of actual business data. That is, no business payload data will be disbursed as part of the consensus process, and data will remain local on a Level 1 node unless the business owner explicitly pushes the data to another node (e.g. for backup/DR), or explicitly allows an authorized node to pull the data via a subscription feed.

LEVEL 2 - ENTERPRISE (VALIDATION) VERIFICATION

This context is defined Enterprise or network wide, and checks for block and individual transaction validity in form, signature, and required data elements.

Verified elements:
    1. Block (verification record) construction and signature
    2. Individual transaction signatures
    3. Individual transaction header elements (that all required header fields are present)

A Level 2 node will assemble a new verification record which will contain:
    1. A list of valid transactions and a list of invalid transaction, and in this manner vote on the validity
of individual transactions.
    2. The hash of the prior Level 2 record created by this node for the same origin (Level 1) node (thus
creating a Level 2 blockchain)
    3. The hash of the Level 1 block which was validated (thus providing a second dimension to the blockchain)

4. Node owner identity information
5. Node deploy location (data center)
6. Node key management authority information

LEVEL 3 - NETWORK DIVERSITY VERIFICATION

Defined enterprise wide, a Level 3 node will verify diversity of validation (Level 2) verifications. That is, a Level 3 node will check the following criteria:

1. Count of Level 2 verification records have been received
2. That those records have come from (configurable count) of unique business units
3. That those records have come from (configurable count) of unique deployment locations
4. That those records have come from (configurable count) of unique key management authorities This verification context will ensure that validations of transactions are coming from a sufficiently diverse set of distributed sources. It also provides control and measurement of network effect and provides distributed security as an attacker would be required to attack multiple systems, businesses, and data centers in order to tamper with existing data.

A Level 3 node will assemble a new verification record containing:

1. Remnants of criteria met (e.g. Level 2 verification record count, set of business units, set of data
centers).
2. The hash of the prior Level 3 record created by this node for the same origin (Level 1) node (thus
creating a Level 3 blockchain)
3. The hash of the Level 2 verification records which passed the criteria (thus providing a second dimension to the blockchain)

LEVEL 4 - EXTERNAL PARTNER (NOTARY) VERIFICATION

Defined network wide (Enterprise+), a level 4 node will provide a notary functionality to the consensus process. Hosted by an external partner, a level 4 node would cryptographically sign any level 3 verification records that it receives. This function allows the Level 4 node to act as an independent witness to level 3 verifications.

LEVEL 5 - PUBLIC CHECKPOINT

A Level 5 node will provide a bridge to one or more public ledger nodes and allow clients to interact with them (e.g. Bitcoin, Ethereum, Litecoin, etc.).

An important feature that this would provide is that of checkpointing, or placing a hash of an artifact for "proof of existence" on a public ledger node. For checkpointing operations, the Level 5 node will accept a transaction, a block verification of any level, an arbitrary string, or an arbitrary hash. The argument will be hashed and this hash added to a transaction placed on the public ledger node(s). The existence of this hash can be used to prove that the artifact was in existence and at a certain state using public ledger node data. An organization may use this proof to measure and mitigate risk based upon the estimate or calculation of hashpower expended since that time (in the case of a proof of work blockchain). For example, a $2 Million transaction may be passed to a Level 5 node to be placed as soon as possible on the Bitcoin blockchain, and at some point in time later, a party may use that information as a source to measure the amount of hashpower that has been expended since that time, calculate the probability that an attacker could successfully counterfeit that Bitcoin block given a particular percentage of global hashpower, and extrapolate or estimate the cost to expend that hashpower (as well as the sacrifice of hardware and/or currency due to network collapse). If this process results in a risk evaluation that is satisfactory to the business, the transaction can be trusted and accepted.

Another important aspect of the public bridge functionality is the ability to track assets between the private and public side. That is, given an internal currency implemented to use Bitcoin addresses (see currency section elsewhere in this document), a token may be issued on Bitcoin using public APIs or services and this token may live in both the private ledger node and the Bitcoin public ledger node. Owners of the keys or wallet would be able to transfer the token or asset with either public or private blockchain interactions. The Level 5 node may be used to track this asset between the blockchains as well as keep them in sync with each other.

LEVEL X - PROPRIETARY CONTEXT VERIFICATION

It should be possible for a business, Enterprise, or the entire network to define a custom verification context and have it executed to meet business needs.

A node may be configured to run an arbitrary verification context which would be triggered in the following manners:

1. By the receipt of a broadcast from another node (in sequential or non-sequential phase)
    2. By a timed or periodic trigger (e.g. cron)
    3. By notification via observer pattern

BLOCKCHAIN OF BLOCKCHAINS CONCEPT

This architecture may be best understood as a *"blockchain of blockchains"*. That is, a business approval function node (see Level 1 below) functions much as a standard blockchain on a 1 dimensional level. However, each business concern will generally have its own node to do this work, each with its own blockchain. It is where these blockchains become combined that consensus is reached.

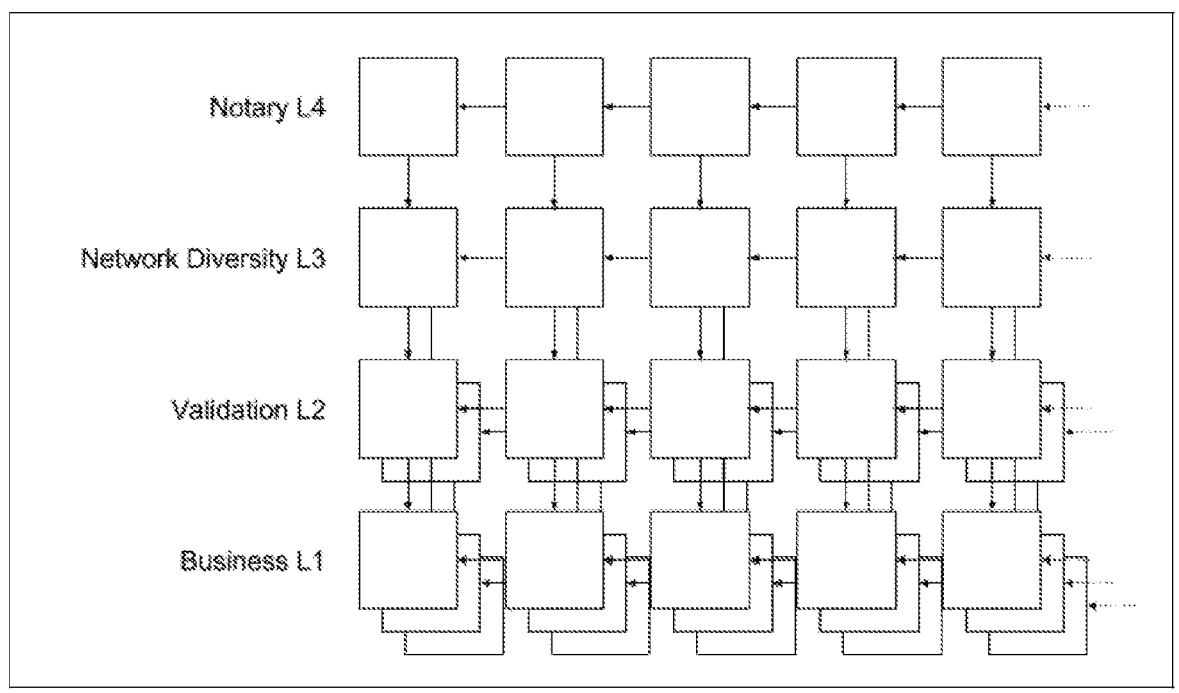

BLOCKCHAIN OF BLOCKCHAINS

CURRENCY

This architecture should be multi-currency capable. That is, generally that if a currency use case is defined, that a node(s) may define a currency and support its use. More than one currency may be in use concurrently on the network as a whole.

That said, this architecture should not define a "base" currency, or one that the system itself runs upon. If such a use case arises (as indeed it is very likely to see value in the availability of a currency whereby nodes may pay each other for verifications), it is the philosophy of this architecture that a node should be configured to create and maintain that currency. This will allow a more flexible development of marketplaces than any attempt to define that early in the development of the platform. The implementation of this architecture should likely provide one or more templated or configurable currencies for ease of deployment. Such implementations may define such things as mining or minting algorithms, addressing, wallet management, and etc. They should also be extensible by users as possible for further experimentation and customization.

CURRENCY MODELING

The architecture allows a user to model currency and monetize late in their design. It is possible for a user to place information from many sources atop the blockchain, watch its use over time, and determine its value based upon business and customer priorities. At this point, assets and activities can be monetized and a mining or minting algorithm may be developed which will incentivize a business' employees, teams, or customers. This process of quantify, monetize, and incentivize may be one of endless tuning, but would provide a transparent economic system.

There is potential for this framework to provide agility in organizations where data providers are enabled to provide immediate and early access to research data, reports, and other information to projects that would not otherwise ever see such data, as it would typically require top-down organizational approval at great cost and risk. The use of such data could be tracked and its value determined, leading to direct monetization and a bottom-up funding mechanism.

BITCOIN ADDRESSING

The base implementation should likely default (at least for the foreseeable future) to utilize Bitcoin addressing and cryptography in order to leverage the ever growing external Bitcoin ecosystem. For example, use of Bitcoin cryptography in a private currency will enable the transparent use of hardware signing wallets for internal use (e.g. KeepKey, Trezor, Ledger). Another example is that of tokenization, whereby one may directly integrate Bitcoin tokenization provider technology for use with an internal blockchain (e.g. Counterparty or Tokenly).

INTEROPERABILITY

With the transaction class header field, it is possible to wrap foreign cryptocurrency transactions within a private ledger node transaction.

SMART CONTRACTS

Many questions arise in regards to blockchain based "smart contracts"...

TURING COMPLETENESS

Top of this list is Turing completeness. Bitcoin is purposely *not* Turing complete. It is as complex as necessary to provide the capabilities needed for its application.

Some blockchain implementations such as Ethereum are Turing complete. This allows some very interesting applications, yet brings some risk and difficulty in implementation. A smart contract should generally be executed within a special and verified container or virtual machine to insure deterministic results no matter the hardware or operating system upon which the node is running. Various aspects of the smart contract should likewise be monitored (e.g. loops) for failure or other unexpected or unauthorized
action.

TRANSACTIONS, ATOMICITY, AND ROLLBACK

A smart contract system may need to provide some level of controlled or automated transaction and rollback capability to ensure that any given action will only take effect if the entire transaction operation is successfully completed.

DISTRIBUTED EXECUTION

Where is the smart contract executed? Is it on the distributed (calling) node?

DRAGONCHAIN SMART CONTRACTS

The architecture calls for definition of "approval context" code to be configured or deployed on Level 1 business nodes. This approval code can be considered a smart contract. By default, this smart contract will only be executed on that Level 1 node(s), and under the direct control of the business owner. This provides a familiar client/server interface to the creation of a smart contract, and simplifies the risk evaluation. The attack vectors are more common and known to modern engineers. Turing completeness is provided just as within any web service platform.

A smart contract may well be distributed, and may be executed on a pay per play basis. In this case, many of the risks with smart contracts described above apply, yet it can be assumed that the parties will have a trust relationship inside of an organization to draw on and the provisioning of the code may include necessary legal agreements.

In much the same way, a group may host smart contracts as an IT support business, and provide varying plans for chargeback/payment.

A smart contract may be employed on a node in the following manners:
- Hardcoded in a forked codebase
- Configured (with smart contract code deployed on system)
- Delivered via blockchain (admin would send multi-signed transaction with smart contract, start date, etc.)

SUBSCRIPTION DATA FEED

As transaction payloads are stripped prior to any broadcast within the consensus process, nodes will share business data as necessary via subscription data feeds. This amounts to a push or pull mechanism where some subset of a nodes transactions are continuously fed to another node.

In the case where a node needs another node's data in order to "mash up" with its own data to serve a customer, that node would configure to request access from the "origin node" which owns the data. This request may come with authentication or authorization information and the origin node may approve or deny the request. The requesting node may also provide criteria for the data feed such as only a certain transaction type, only transactions that have surpassed a certain level of verification on the network, or only involving a certain identity. In this way, the requesting node will have a local cache of only the data that it needs, and it will be able to answer its customers with confidence that the data is unaltered and verified without the need to reach out to the origin business services in the future.

In the case where an origin node would like to distribute its data (i.e. for backup or disaster recovery), the node may pay for such a service and continuously push the data to that node. The backup node will be able to verify that the data is error free upon receipt and periodic audit.

NETWORK MANAGEMENT

For a blockchain network system, many typical elements will necessarily exist such as provisioning, discovery, maintenance of available and quality nodes, etc. The architecture will however take some philosophical positions on the configuration and maintenance of the network.

All considerations for network and communications management should in this architecture be made from the individual node context. Such decisions as which nodes to connect with should be decentralized decisions made by each node independently. There may well be mechanisms for central management of hints or starting lists of guaranteed available nodes within an Enterprise, but no attempt should be made to centralize the connection requirements of the network.

DATA DISTRIBUTION

By default, no transaction payload (business) data should leave an origin (owning) node nor be propagated across the network. As part of the consensus and network communications, all transaction payloads are to be stripped prior to broadcasting.

Only when explicitly authorized by the origin node are the payloads and full transactions caused to be broadcast to authorized nodes.

NODE DISCOVERY
Node discovery should take place via peer to peer request.

NETWORK MARKETPLACE
IMPORTANT: Any notion of marketplace or currency with which nodes may trade or hire out verifications should not be implemented in the system infrastructure, but rather as an add-on currency implementation on a node within the blockchain network. In this manner, the architecture will remain flexible and open to new ideas or unforeseen requirements.

NODE QUALITY ASSESSMENT
A node should track and ascertain the quality of connected and disconnected individual peers. Considering currently connected and disconnected peers separately, a node should track attributes such as:

Average latency of the connection (periodically assessed)
    Signing success rate
    Rebroadcast counts
    Average verification time
    Deploy location (for diversity criteria)
    Owner (for diversity criteria)
    Unsuccessful connection attempts
    Last connection attempt
    Node success in gaining further levels of context based verification A node should conduct periodic assessment of connected nodes more often than disconnected nodes, however over a reasonable span, the node should assess quality of disconnected nodes in order to have necessary intelligence to prioritize peer connections should a large portion of connected nodes become unavailable.

VERIFICATION RECEIPT
A broadcast of a verification record to a higher level verification node should provide a receipt message notifying success or failure, and if successful, should include the verification record as signed by the higher level node. This same mechanism should be passed further down the line to reach the origin node. Although it is a design consideration, something in the manner of an asynchronous reply to another broadcast call may be an appropriate mechanism to provide such capability.

IMPLEMENTATION OPTIONS
    Custom (e.g. Apache Thrift)
    RESTful service calls
    Distributed database framework with replication

INTEROPERABILITY AND PROPOSED STANDARDS
There are many avenues to consider for the question of interoperability with other blockchain systems.

CHECKPOINTING & WRAPPING
One may choose to connect transactions or other artifacts via checkpointing (see Level 5 - Public Checkpoint above) or by wrapping a foreign transaction or artifact within a Dragonchain transaction (see foreign currency transaction header above).

SUBCONSENSUS
A business may choose to employ another blockchain at any level of the verification process. For example, to provide a decentralized Level 1 approval implementation, one may choose to employ Bitcoin or other proof of work based blockchain to come to consensus on a currency transactions.

Appendix B: Dragonchain Commercial Platform

Version 7, September 2017

Background

Dragonchain was originally developed at Disney's Seattle office in 2015 and 2016 as the Disney Private Blockchain Platform . Over 20 use cases and applications[1] were explored and documented publicly via the W3C Blockchain Community Group[2]. The platform was later released as open source software under the Apache 2 license in October of 2016.

Dragonchain simplifies the integration of real business applications onto a blockchain and provides features such as easy integration, protection of business data and operations, currency agnosticism, and multi-currency support.

The Dragonchain Foundation, a Non-Profit Corporation was created in January of 2017 to maintain ownership and responsibility of the open source code.

The Dragonchain team is now in the process of launching a commercial entity to build a serverless architecture blockchain platform, and an incubator. The combination of serverless and blockchain technologies is unique and tremendously valuable. The timing of the Dragonchain platform launch is highly strategic to benefit from explosive growth of cloud computing over the last few years and the emerging wave of Blockchain solutions entering proof of concept stage across enterprises.

Vision

The Dragonchain team will launch Dragonchain, Inc., as a commercial entity to provide an array of products and services to the community. Our vision supports areas of the market that are underserved with strong demand and projected growth in the blockchain industry ($7.7b by 2024[3]) across an array of multi-billion dollar sectors such as Arts, Wine, Automotive, Legal, Digital Marketing, etc. These sectors and more will experience market disruption with blockchain

---

[1] W3C - Disney Dragonchain - Blockchain Use Cases - https://dragonchain.github.io/blockchain-use-cases
[2] W3C Blockchain Community Group - https://www.w3.org/community/blockchain/
[3] Grand View Research http://www.grandviewresearch.com/press-release/global-blockchain-technology-market ©2017, 2018 Dragonchain Dragonchain Commercial Platform v7 Page 1 capabilities shifting the value proposition into decentralized environments. Dragonchain platform will support these needs.

A Turnkey Blockchain Platform for Business

Dragonchain provides a commercial platform for application developers to rapidly and securely deploy Blockchain applications while maintaining existing language development environments (e.g. Java, Python, Node, C#, Go); a tremendous costing and speed to market advantage. The Dragonchain architecture is also designed to allow nodes to handle approval of transactions based upon five levels of network consensus to provide a spectrum of trust to data consumers; a level of security and flexibility unseen in the market by current blockchain solution providers. These design attributes position Dragonchain for exponential growth.

- Serverless system and smart contracts
- Established language support for smart contracts (Java, Python, Node, C#, Go, etc.)
- Scalable - Amazon AWS and Google deployments
- Secure - Protection of business data and operations
- Advanced currency implementations
- Smart contract libraries
- Currency Agnostic Benefits

- Lower development cost utilizing existing development languages
- Faster speed to market
- Significantly higher levels of security
- Higher scalability

DragonFund Incubator

Dragonchain will provide project incubation as well as professional services with strategic partnerships to develop successful tokenization ecosystems focusing on long term value. This includes;

- Standard processes for the incubation of blockchain startups and new integrations
- Marketplace dashboard for community engagement to monitor and compare projects
- Direct access to legal, technical, marketing, and economic subject matter experts as partners for advice and support
- Dragonchain platform team to model digital economics aligned with token model; business design, user acquisition and retention, lifetime value, creation of network effects, monetization models, data strategy, and KPI's.
- Expedited launch cycles
- Sustainable token marketplaces ©2017, 2018 Dragonchain    Dragonchain Commercial Platform v7 Page 2

Problem: Security on a Blockchain Platform

Data exposure and security is a known issue to large institutions wanting to leverage blockchain technology, as they typically have very sensitive customer data that sometimes has regulatory or legal risks associated (e.g. banking, health, identity, etc.). The data exposure risk can be somewhat alleviated by either obfuscation or separation, however, in both cases, this requires extra design and development work up front, as well as reduces somewhat the utility of the blockchain system itself.

A so far generally unrecognized risk in the use of blockchain technology is that associated with the public exposure of smart contract logic as necessary on most blockchain platforms. The smart contract is exposed and transparent which means that the team must implement very sensitive proprietary business logic in a separate system. Also, any obfuscated data may be unraveled by an interested viewer of transactions.

Most important however is the combined risk of exposed data and business logic, as it is the equivalent of placing your operational system, all of your data, and a bounty of funds in the public domain. Unlike the well understood and successful open source model, where the discoverer of a flaw or vulnerability in utility software is incentivized to to fix the issue or notify the community of its existence, in the case of a discovered vulnerability on a blockchain, the discoverer is actually incentivized to attack the smart contract and withdraw funds or valuable information.

Skill Set Challenge

Leveraging blockchain technology for real business initiatives is expensive and very risky in an operational environment. This can be expected to result in low success rates as creation of software without blockchain technology is already fraught with difficulty and the addition of a relatively new technology such as blockchain with features such as cryptography, Proof of work, economics, currency modeling, game theory, and custom programming languages is sure to cause more trouble for a team as the overlap of these skills is particularly rare.

Dragonchain solves this problem by allowing development and integration before the economic model is known. Monetization can be applied after a system is functioning and enough real data is available for analysis.

Solution & Business Focus

When Dragonchain was originally launched, the team had several goals in mind based upon past experience developing blockchain solutions:

- Protection of Business Data and Processes
- Ease of Integration
- Simplified Development
- RESTful Interfaces
- Simple Architecture
- Short, Fixed Length Block Time
- No Base Currency
- Currency Agnostic with Multi-Currency Support
- Interoperability with other Blockchains
- Adoption of Standards The platform was designed for use in a wide variety of use cases and applications. It is particularly useful in non-financial systems and in monetization and modeling of micro-economies for example to replace political economies within an organization with transparent rules to incentivize productive or otherwise valued behavior.

Verification and Consensus

In the open source Dragonchain Architecture document[4], we introduced the concept of "context based verification" wherein Dragonchain adds another dimension to the common blockchain model. This new structure may be best thought of as a "blockchain of blockchains," where business nodes handle approval of transactions based upon local and sometimes proprietary business logic.

The Dragonchain architecture provides five standardized levels of consensus to provide a spectrum of trust to consumers of data;

1. Business (Approval) Verification
2. Enterprise (Validation) Verification
3. Network Diversity Verification
4. External Partner (Notary) Verification
5. Public Checkpoint Verification

---

[4] Dragonchain Architecture - https://dragonchain.github.io/architecture

As the verification level increases for a block, security increases, risk decreases, and measure of risk becomes possible.

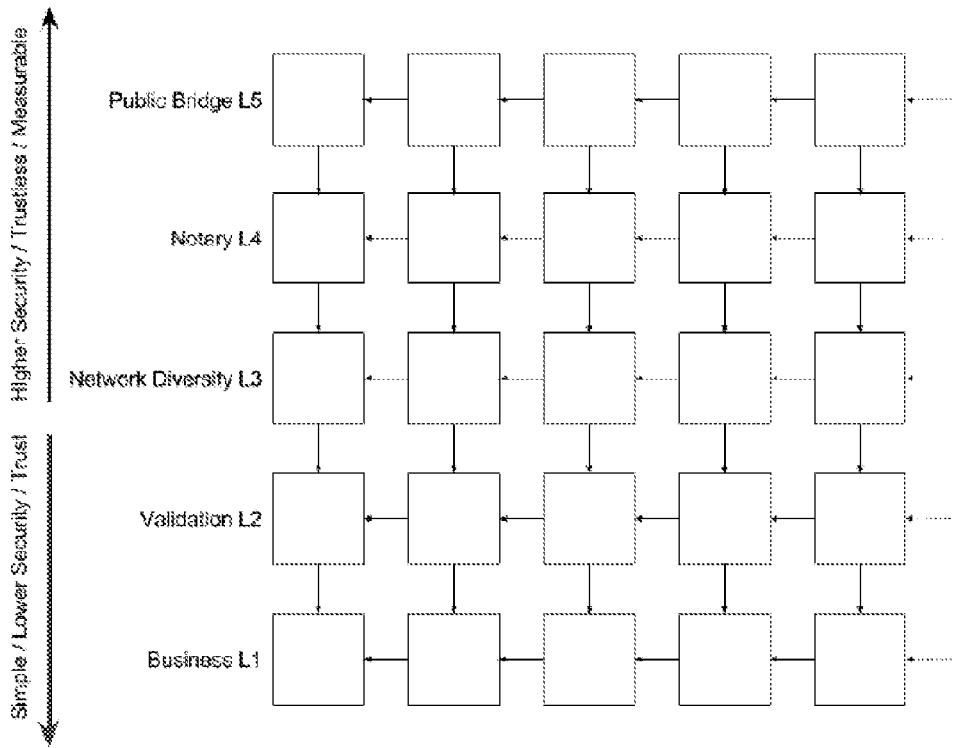

Level 1 Business Verification (Approval)

Analogous to other blockchain systems, the business context provides localized approval of transactions and operates primarily on a trust basis. Although a proof algorithm can be applied, it is not necessary as data approved at this level can be considered trusted by the team that owns the data and any other team that decides to trust that data. This may best be viewed as web services on a blockchain, where developers familiar with web services or similar traditional services development may productively leverage blockchain technology.

Use of this model has been shown to improve the blockchain technology learning curve, as well as lower the risk of decentralized system development. A team can build atop the Dragonchain system to integrate existing systems or add new capabilities without a full understanding of the economic modeling that may later become valuable. That is, many projects have seen value by starting with data transparency as a goal, followed by late binding to an economic model based upon historical evidence.

Note that any data contained in the business defined payload of a transaction will not move across the network unless explicitly authorized by the owner of a node(s).

Level 2 Enterprise Verification (Validation)
This context is defined Enterprise or network wide, and checks for block and individual transaction validity in form, signature, and required data elements. This can be considered as providing "Real-time Enterprise Governance" with rules defined at the Enterprise level for validation of all transactions regardless of the local business data.

Level 3 Network Diversity Verification
A Level 3 node will verify diversity of validation (Level 2) verifications. This verification context will ensure that validations of transactions are coming from a sufficiently diverse set of distributed sources. It also provides control and measurement of network effect and provides distributed security as an attacker would be required to attack multiple systems, businesses, and data centers in order to tamper with existing data.

Level 4 External Partner Verification (Notary)
A level 4 node will provide a notary functionality to the consensus process. Hosted by an external partner, a level 4 node cryptographically signs any level 3 verification records that it receives. This function allows the Level 4 node to act as an independent witness to level 3 verifications.

Level 5 Public Verification (Public Checkpoint)
A Level 5 node will provide a bridge to one or more public ledger nodes and allow clients to interact with them (e.g. Bitcoin, Ethereum, Litecoin, etc.).

With this, Dragonchain is able to provide a spectrum of trust for the consumer of blockchain data, where risk is accepted based upon a combination of real world contracts, reputation of nodes, and trustless system assertions. That is, one may trust one's own data as valid, but require varying levels of consensus verification before accepting a partner or foreign node for use. The system will provide a human readable report as well as API access to this capability.

Currency

Dragonchain is intentionally "currency agnostic". That is, the architecture defines the ability to create a blockchain without currency, or with one or more currencies in place. We've experimented with and expect to make available interesting currency features.

See the Dragonchain open source architecture document for a full description of the currency architecture.

Serverless Deployment

With the commercial launch of Dragonchain, Inc., we are leveraging the architecture of the Dragonchain platform to provide a serverless blockchain platform for business use. Dragonchain's hybrid model allows a serverless approach, because the smart contracts are executed in a traditional model and on a trusted node. A team can productively use the talents of a traditional software engineer, along with best practices to build a system, whilst leveraging the capabilities of blockchain technology.

We will initially launch on Amazon AWS, with the entire system using AWS Lambda services, and with all user provisioned smart contracts deployed as Lambda services. Deployment in this manner will provide to the user the full scaling capacity of the AWS platform as well as all available services. In the future, we expect to port the system for deployment to Google App Engine and Apache OpenWhisk for internal datacenter deployment.

Availability of Established Languages

With this arrangement, and due to the abstraction of trust provided by the Dragonchain architecture, the user has access to multiple full languages as supported by AWS[5]:
- Python
- Java
- Node.js
- C#

These languages are consistently ranked in the top 10 for usage in the real world in such surveys and studies as *Redmonk Programming Language Ratings*[6], *Stack Overflow Developer Survey*[7], *Github Language Trends*[8], and *PYPL Programming Language Popularity Index*[9]. Availability of popular, established, and well understood languages for safe and secure use on a blockchain is a valuable capability in convenience and risk to the team and for adoption of the Dragonchain platform. Millions of active developers currently code fluently in one or more of these languages and Dragonchain will provide an easy path for these developers toward the use of blockchain technology.

Dragon™ Tokens

Dragon™ tokens (AKA "Dragons") represent a tokenized license for interaction with Dragonchain commercial platform services. The tokens will be issued and provided to the public via an open

---

[5] AWS Lambda FAQs - https://aws.amazon.com/lambda/faqs/
[6] Redmonk Programming Language Ratings - http://redmonk.com/sogrady/2017/03/17/language-rankings-1-17/
[7] Stack Overflow Developer Survey 2017 - https://insights.stackoverflow.com/survey/2017#technology
[8] The State of the Octoverse 2016 - https://octoverse.github.com/
[9] PYPL Programming Language Popularity Index - *http://pypl.github.io/PYPL.html* sale in 2017. For more information, check the official token sale page: https://dragonchain.com/tokensale.

Utility

Dragons will be used by developers and organizations to interact with the Dragonchain commercial platform products and services (e.g. launch nodes, provision smart contracts, access incubator dashboard, etc.). As a tokenized license with value in utility service rights, the tokens will further allow individuals or organization to be rewarded in an open market for running public or private nodes for network consensus.

Dragons will also be used to support projects in the DragonFund Incubator. They will provide early access to technology and data from the projects, as well as allow first access to purchase tokens for use on the developed platforms.

For the Dragonchain Foundation, the maintainer of the Dragonchain open source code, Dragons will be used to reward and incentivize developers contributing to the open source project and related projects. The tokens will be used to increase adoption in the developer community with rewards and training. Community members will be able to contribute on issues and designs, and reward active participation in the development of important functionality anywhere in the world.

Go To Market Strategy

Dragonchain will penetrate the market through developer relations, corporate sales, and start-up services ranging from advisory to financing to development. To achieve this, the team and go to market protocols are assigned across a geographic emphasis with market managers across 3 separate regions; Asia, USA, Europe. The role of the market manager is primarily concerned with localization issues and second the specific market tailored offerings.

The nucleus of Dragonchain's growth will stem from a blend of technology and incubation services. The technology model is similar to Amazon's AWS model, and the incubation model is similar to Y-Combinator. Both highly prominent organizations that are deep rooted with community and market success.

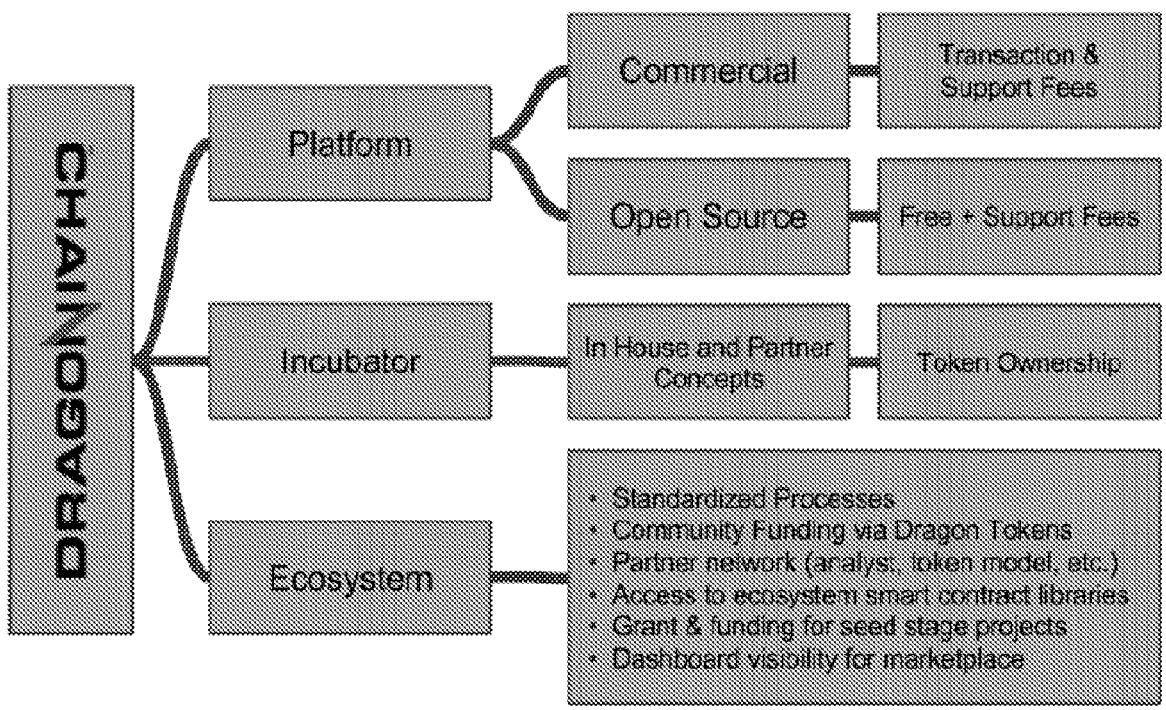

Professional Services

Dragonchain will provide two levels of professional services, those offered by company staff and those provided by qualified preferred vendors. This will be for the purpose of helping new offerings into the world of blockchain and token offerings to successfully launch that allow for value creation, operational flexibility, and competitive advantage.

Services will span across legal, strategic, marketing, development, and finance. Assigning

Appendix C: Tokenized Micro-License

Background

Before the 1990s, many software makers sold licenses to use a particular version of a software product. With the connectivity of the Internet, software could soon be updated readily by the vendor, many software products were licensed for all updates for a major version of the product. That is, the user would have license rights to obtain and use all updates to a product until a new, major version was released. After a new release, they could continue to use the old and unsupported version or purchase an upgrade. This offered added flexibility to the consumer and vendor. The vendor could make much needed updates to fix bugs found after release and provide non-major upgrades. The consumer would get some level of new value in minor version of the product and also physically held the software to use at any time in the future. Some examples of the use of the version-based licensing model are Microsoft Windows 3.1 and Adobe Photoshop 7.0.

In the 1990s and 2000s, many software vendors began to use the approaching ubiquity of the Internet to provide subscription-based licensing, wherein the consumer pays on a time basis for access to software. In this model, the user will typically not hold the software or run it on a local machine. Instead, the software is managed and executed on centrally managed hardware by the vendor. This allows for very simple updates to the software in place in a consistent manner and will generally lower maintenance cost to the consumer and vendor. The vendor can control access to the services as well, and provide the ability to provide feature driven pricing models for the services and particular advanced features. The negative for the consumer is generally in the loss of right and possession of the software. The model generally represents the shift from licensing rights to *own* the purchased software and *possess* it physically to a *utility* focused right. That is, the consumer has a right to access the service or its underlying application software interfaces (API). The consumer never possesses the software or its executable code. If the consumer stops paying for the subscription, access is withdrawn and is unavailable.

Among other issues, this model did not standardize or solve the resulting issue with ownership of the consumers' data on the system. That is, when using a subscription license, how does a user retain control of the data produced or held in the subscription-based license system? If the system stores the data in the vendor's infrastructure (very typical due to efficiency), then the consumer will need some ability to extract their data from the vendor's storage. Some examples of the use of the subscription licensing model are Google GSuite, Microsoft Office 365, and Adobe Creative Cloud.

The Tokenized Micro-License

Dragonchain's Tokenized Micro-License (TML) was created to provide a new model for software access. It allows the local holding of licenses much like the early models, yet allows for vendor or decentralized hosting of the software services. It also standardizes for many flexible forms of redemption via software access and execution. For the vendor, licensing is more flexible, and powerful anti-piracy measures are possible. Updates to services can be controlled much like in the subscription model. For the consumer, a user is not paying for software utility that isn't being used. Ceaseless passing of time does not itself penalize.

License ownership is recorded on the blockchain and decentralizes ownership and control. Asymmetric encryption technology (public key cryptography) is used to enable the consumer to physically hold the key which "own" the tokens.

TML Service Interaction

The token itself contains a license that is maintained on the blockchain with both programmatic (smart contract based) terms and human readable (traditional legal) terms embedded. The token's license interacts on every use, execution, or access with a license embedded into every service (programmatic/smart contract and traditional) to create a very flexible framework for software license innovation.

The terms for both the token and all services can be updated on the blockchain in a manner that allows anyone to prove and/or verify that a particular execution occurred under a particular set of license terms (or other legal arrangement). This model also allows for a very flexible update arrangement wherein a vendor may do things such as specify license update frequency, specify terms for notice on updates, or allow consumers to vote on terms or feature updates. This model can also solve issues with access to data stored on the vendor's system as the public keys of the owner may be allowed access to their owned data even if they no longer hold license access to the system services.

This can more directly model the commoditization of service utility in the "Software as a Service" or "Platform as a Service" hosting models so prevalent today. It allows for commodity service micro-payments (e.g. Amazon AWS, Google Cloud, MS Azure) to be modeled into the license itself and to be controlled in a more granular fashion. It also allows the ability to track and audit billing in a provable and transparent manner.

SEC

The U.S. Securities and Exchange Commission (SEC) has a three-part mission: Protect investors. Maintain fair, orderly, and efficient markets. Facilitate capital formation.

Protection of Purchasers

Dragonchain has protected purchasers of Dragons by:
- Not selling a single Dragon controlled by the company even at the all time high in market price (45%) of the total supply
- Providing a market based price sale model - the fairest possible pricing mechanism.
- Creating unique procedures for secure and authenticated communication of announcements to the community.
- Conducting unprecedented audits of its license token sale - numerous internal audits and 4 independent external audits (at its own cost).
- Providing a unique mechanism to avoid pump and dump activity - the Dragon Days of Slumber calculation and Dragon Slumber Score
- Continuously seeking out scams against the community (not just the company itself) and paying high legal fees to stop the attacks with take down notices and cease and desist orders.
- Spending a great deal of money to stop a heavily funded attack from China.
- Providing education in its forums and social networks to teach the community how to identify a likely scam and to communicate with others to expose a potential scam. Though we weathered dozens of scam attempts, to our knowledge, not a single scam succeeded in a payment from our community.
- Protecting individuals from their mistakes. Though most token sales ignored the mistake of a contributor (e.g. sending from an exchange account or having a compromised wallet), we set a standardized process to allow the safe recovery of such mistakes. We spent a great deal of time and effort in building that process and carrying it out. Out of 73 exceptions, only 11 remain in process. Each exception requires hours of verification and processing to complete.

- Instituting an employee social network policy to explicitly not provide rumor or innuendo with regard to upcoming news.
- Instituting a team Dragon distribution policy that strongly disincentivizes employees to sell Dragons based upon DSS calculation.

Dragonchain License Sale Model and Marketing

Dragonchain will provide a unique sale model designed to provide a fair pricing for the licenses, to avoid fear, speculation, and manipulation that is becoming too prevalent. We sought to discourage speculative involvement as the many "pump and dump" schemes.

Our model was based in finding the fairest market price for the Dragon licenses. We accepted BTC and ETH throughout the token sale period. Dragon license tokens would be distributed proportionally based upon value contributed (market value).

This model resulted in the intended very low level of public attention and a wide distribution to consumers of the software services.

The company was successful in educating the community about the nature of the many scams and attacks that occur in the cryptocurrency and blockchain world. We actually saw dozens of attacks against the company and its community on social networks like Slack, Telegram, Twitter, Facebook, and email. Dragonchain spent much time, energy, money, and legal fees to countering individual attacks and educating the community to avoid becoming victims of such attacks. The company issued many take down notices, cease and desist orders, and other process and legal arrangements to knock down sites that were executing attacks on innocent people. We did not record a single successful base attack or scam. No one to our knowledge sent any cryptocurrency or money to an attacker in any of the social network forums.

Other than during the token sale, Dragonchain has not sold any of the software license tokens. The declared distributions to the Dragonchain related entities occurred (Dragonchain Foundation, Incubator, team and partner, etc.) during the distribution to the license purchasers. Some distribution has occurred to partners and team, but *the company has sold no Dragons nor has an account in any exchange upon which the tokens trade*. We've further instituted a policy in the team distributions to disincentivize their transfer or sale from the wallet to which they are distributed to avoid any notion of improper or unfair trading practices by team members. The distribution from the team & partner pool was declared to be no sooner than a quarterly allotment over two years. We will in practice be distributing them much more slowly.

What is claimed is:

1. A transistor-based distributed ledger interaction method comprising:

recording one or more elements of a first version of a first smart contract privately on a first cryptographically authenticatable node residing on one or more servers; and executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, and wherein said executing said first version of said first smart contract comprises:

accepting an expenditure of a special-purpose cryptographic utility token belonging to an entity who transmitted a request for an execution of said first smart contract, wherein said expenditure is conditional upon said request being granted, wherein said special-purpose cryptographic utility token contains an embedded license term in a smart contract codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract initiation protocol;

iteratively monitoring one or more public nodes for one or more requester-specified phenomena of interest, wherein said one or more requester-specified phenomena of interest include first and second asset transfers from a requester-specified digital wallet; and transmitting to a public blockchain a result of said first transaction of said second smart contract partly based on said first cryptographically authenticatable node data from said first cryptographically authenticatable node and partly based on said distributed ledger destination being implemented.

2. The transistor-based distributed ledger interaction method of claim 1, further comprising:

transmitting a result of said second contract to a cryptographically secured handheld digital wallet configured to receive at least a fraction of said special-purpose cryptographic utility token.

3. The transistor-based distributed ledger interaction method of claim 1, wherein said executing said first version of said first smart contract comprises:

iteratively monitoring one or more public nodes for one or more requester-specified phenomena of interest by iteratively executing said first transaction of said second smart contract, wherein said one or more requester-specified phenomena of interest include a transaction pertaining to a requester-specified digital wallet.

4. The transistor-based distributed ledger interaction method of claim 1, wherein said distributed ledger destination identifies said first cryptographically authenticatable node.

5. The transistor-based distributed ledger interaction method of claim 1, wherein said distributed ledger destination identifies a second cryptographically authenticatable node and wherein said second cryptographically authenticatable node comprises a blockchain node.

6. The transistor-based distributed ledger interaction method of claim 1, wherein an expenditure of at least a fraction of a cryptographic utility token by an entity who requests a service that includes executing said first smart contract increases a time interval until that entity obtains an eligibility.

7. The transistor-based distributed ledger interaction method of claim 1, wherein said invoking said transistor-based circuitry configured to execute said first version of said first smart contract comprises:

conditioning an execution of said first version of said first smart contract upon a first trustworthiness indication reaching an execution trust requirement, wherein a first entity is associated with said execution trust requirement upon a completion of a first temporal interval that depends upon a utility token balance of said first entity during said first temporal interval, wherein a second entity is associated with said execution trust requirement upon a completion of a second temporal interval that depends upon a utility token balance of said second entity during said second temporal interval, wherein a third entity is associated with said execution trust requirement upon a completion of a third temporal interval that depends upon a utility token balance of said third entity during said third temporal interval, and wherein all of said temporal intervals are negatively correlated with said utility token balances.

8. The transistor-based distributed ledger interaction method of claim 1, wherein said transistor-based circuitry configured to execute said first version of said first smart contract comprises:

conditioning an execution of said first version of said first smart contract upon a first trustworthiness indication reaching a threshold value, wherein a first entity is associated with an execution trust requirement in a first temporal interval having a duration that is negatively correlated with a cryptographic token balance of said first entity during said first temporal interval, wherein negative correlation signifies that a second entity is associated with said execution trust requirement in a second temporal interval that is longer than said first temporal interval because said second entity has had a lower cryptographic token balance than said cryptographic token balance of said first entity during said first temporal interval, and wherein a third entity is associated with said execution trust requirement in a third temporal interval that is shorter than said first temporal interval because said third entity has had a higher cryptographic token balance than said cryptographic token balance of said first entity during said first temporal interval.

9. The transistor-based distributed ledger interaction method of claim 1, wherein said first cryptographically authenticatable node resides on one or more private servers wherein one or more instances of application-type code components are configured to be initiated only by an expenditure of at least a fraction of a special-purpose cryptographic utility token and wherein said special-purpose cryptographic utility token indicates a first embedded license term in a smart contract codifying one or more requirements that a request must fulfill before a particular service identified by said request may be accessed.

10. The transistor-based distributed ledger interaction method of claim 1, wherein said first cryptographically authenticatable node resides on one or more private servers configured so that one or more instances of code components are impossible for a particular user to initiate directly through any cryptocurrency but in which said particular user can initiate an execution of at least one of said one or more code components by expending at least a fraction of a special-purpose cryptographic utility token owned by said particular user.

11. The transistor-based distributed ledger interaction method of claim 1, wherein said one or more elements of said first version of said first smart contract comprise a movement of one or more special-purpose cryptographic utility tokens and wherein said one or more elements of said first version of said first smart contract are recorded privately insofar that said first cryptographically authenticatable node and said first cryptographically authenticatable node are separated by a firewall.

12. The transistor-based distributed ledger interaction method of claim 1, wherein said executing said first version of said first smart contract causes one or more processors to transmit said first transaction of said second smart contract to a second cryptographically authenticatable node, wherein said first cryptographically authenticatable node data includes a first termset version identifier and wherein said prior cryptographically authenticatable node data includes a prior termset version identifier.

13. The transistor-based distributed ledger interaction method of claim 1, wherein said distributed ledger destination implements a serverless architecture blockchain platform.

14. A transistor-based distributed ledger interaction system comprising:
one or more processors;
memory;
means for recording one or more elements of a first version of a first smart contract privately on a first cryptographically authenticatable node in said memory; and
means for executing said first version of said first smart contract in said memory by said one or more processors so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, wherein said executing said first version of said first smart contract comprises:
accepting an expenditure of a special-purpose cryptographic utility token belonging to an entity who transmitted a request for an execution of said first smart contract, wherein said expenditure is conditional upon said request being granted, wherein said special-purpose cryptographic utility token contains an embedded license term in a smart contract codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract protocol;
iteratively monitoring one or more public nodes for one or more requester-specified phenomena of interest, wherein said one or more requester-specified phenomena of interest include first and second asset transfers from a requester-specified digital wallet; and
transmitting to a public blockchain a result of said first transaction of said second smart contract partly based on said first cryptographically authenticatable node data from said first cryptographically authenticatable node and partly based on said distributed ledger destination being implemented.

15. A computer program product comprising:
one or more non-transitory computer readable media; and
one or more instructions stored thereon that, when executed by one or more processors, cause the one or more processors to execute a transistor-based distributed ledger interaction method comprising:
recording one or more elements of a first version of a first smart contract privately on a first cryptographically authenticatable node residing on one or more private servers; and
executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, and wherein said executing said first version of said first smart contract comprises:
accepting an expenditure of a special-purpose cryptographic utility token belonging to an entity who transmitted a request for an execution of said first smart contract, wherein said expenditure is conditional upon said request being granted, wherein said special-purpose cryptographic utility token contains an embedded license term in a smart contract codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract initiation protocol;

iteratively monitoring one or more public nodes for one or more requester-specified phenomena of interest, wherein said one or more requester-specified phenomena of interest include first and second asset transfers from a requester-specified digital wallet; and transmitting to a public blockchain a result of said first transaction of said second smart contract partly based on said first cryptographically authenticatable node data from said first cryptographically authenticatable node and partly based on said distributed ledger destination being implemented.

16. The non-transitory computer readable medium of claim 15, wherein said first cryptographically authenticatable node resides on one or more private servers configured and wherein said non-transitory computer readable medium is configured so that an execution of one or more instances of code components is impossible for a particular user to initiate directly through any cryptocurrency but in which said particular user can initiate an execution of at least one of said one or more code components by expending at least a fraction of said special-purpose cryptographic utility token.

17. The non-transitory computer readable medium of claim 15, wherein said non-transitory computer readable medium is configured so that said executing said first version of said first smart contract in said method causes a transmission of said first transaction of said second smart contract to said first cryptographically authenticatable node, wherein said first cryptographically authenticatable node data includes a first termset version identifier, and wherein said prior cryptographically authenticatable node data includes a prior termset version identifier.

18. The transistor-based distributed ledger interaction method of claim 1, wherein said distributed ledger destination identifies said first cryptographically authenticatable node.

19. The transistor-based distributed ledger interaction method of claim 1, wherein said distributed ledger destination identifies a second cryptographically authenticatable node.

20. The transistor-based distributed ledger interaction method of claim 1, wherein said distributed ledger destination identifies said first cryptographically authenticatable node and a second cryptographically authenticatable node.

\* \* \* \* \*